United States Patent [19]

Kuroda et al.

[11] Patent Number: 5,646,799
[45] Date of Patent: Jul. 8, 1997

[54] CASSETTE LOADING APPARATUS

[75] Inventors: Tadashi Kuroda, Kobe; Takashi Torii, Osaka, both of Japan

[73] Assignee: Matsushita Electric Industrial Co., Ltd., Osaka-fu, Japan

[21] Appl. No.: 662,481

[22] Filed: Jun. 3, 1996

[30] Foreign Application Priority Data

Jun. 2, 1995 [JP] Japan .................. 7-136463

[51] Int. Cl.⁶ .................. G11B 15/675; G11B 5/54
[52] U.S. Cl. .................. 360/96.6; 360/105
[58] Field of Search .................. 360/96.5, 96.6, 360/105

[56] References Cited

U.S. PATENT DOCUMENTS 5,018,032  5/1991  Otsuki .................. 360/105
5,377,061  12/1994  Yoshimura .................. 360/105

*Primary Examiner*—Robert S. Tupper
*Attorney, Agent, or Firm*—Wenderoth, Lind & Ponack

[57] ABSTRACT

A cassette loading apparatus for a cassette tape recorder includes a solenoid unit for controlling various operating conditions of the cassette tape recorder. The solenoid unit is connected with an eject rod through a connecting member and is engageable with a cassette holder and a slide plate carried by the cassette holder. The position of the eject rod is controlled according to the position of the cassette holder between an open position (a cassette eject position) and a closed position (a tape play position) so that when the cassette holder is in the open position, an attracting operation of the solenoid unit is inhibited, but when the cassette holder is in the closed position the attracting operation of the solenoid is enabled.

4 Claims, 19 Drawing Sheets

CASSETTE LOADING APPARATUS

BACKGROUND OF THE INVENTION

1. Field of the Invention

The present invention relates to a cassette loading apparatus for a cassette tape recorder which is designed to increase the reliability and the operativity in mounting a tape cassette onto a tape recorder mechanism.

2. Description of the Prior Art

While in recent years attempts have been made to reduce the cost of manufacture, the size and the weight of electric audio appliances, improvement in operativity and quality has come to be demanded.

With the prior art tape recorder mechanism, in order to increase the reliability in mounting of the tape cassette, the use of an electric switch has been generally made to detect the mounting of the tape cassette so that unless the tape cassette is properly mounted at a normal position at which the tape recorder mechanism operates to play, i.e., record or reproduce information on or from a length of tape, the tape recorder mechanism can be disabled. Should the tape recorder mechanism be enabled while by some other reason the tape cassette has not been properly mounted at the normal position at which the tape recorder mechanism operates to play, in order to avoid any possible abnormality or trouble which would be brought about by damage to the tape cassette, a magnetic recording and/or reproducing head and/or inhibition of rotation of the drive motor resulting from collision of the magnetic head with the tape cassette incident to movement of a head carrier plate having the magnetic head mounted thereon, mechanism component parts have been so designed and so configured as to mount a magnetic recording and/or reproducing head on a head carrier plate through a separate member so that in the event of the collision, the magnetic head can be escaped together with the separate member to lessen the impact which would be brought about by the collision, thereby preventing the drive motor as well from being excessively loaded.

However, the attempt having hitherto been made requires the use of an electric circuit in combination with the switch, rendering the assembly to be costly. In addition, in order for the switch to accurately detect the position of the tape cassette, an excessive stroke is required to compensate for variation in position of the switch contacts and also to ensure a proper contact pressure. Moreover, there is many problems associated with the quality and reliability such as, for example, the abnormality or trouble resulting from damages to the tape cassette and/or the magnetic head and/or blockage of rotation of the motor which would occur as a result of collision of the magnetic head against the tape cassette incident to movement of the head carrier plate carrying the magnetic head particularly when the tape recorder mechanism is enabled while the tape cassette has not yet been properly mounted at the normal position at which the tape recorder mechanism can operate to play, the magnetic head may collide.

In order to substantially eliminate those problems, the mechanism component parts should be so configured and so designed as to mount the magnetic head on a separate member which is in turn mounted on the head carrier plate so that in the event of the collision the magnetic head can be escaped together with the separate member to thereby lessen the impact and also to prevent the drive motor from being excessively loaded, involving an increase in cost, size and weight and a reduction in quality.

SUMMARY OF THE INVENTION

The present invention has been devised to substantially eliminate the above discussed problems and is intended to provide an improved compact, highly reliable and lightweight cassette loading apparatus effective to increase the reliability and the stability in mounting of the tape cassette onto the tape recorder mechanism.

In order to accomplish this object of the present invention, a broad aspect of the present invention provides a cassette loading apparatus for a cassette tape recorder of a type including a head carrier carrying a magnetic recording and/or reproducing head and movable between stop and reproducing positions in a direction confronting a front face of the magnetic recording and/or reproducing head. The cassette loading apparatus includes a drive motor for driving the cassette tape recorder; a gear means drivingly coupled with the drive motor; a rotary gear engageable with the gear means to rotate to thereby control the stop and reproducing positions of the head carrier through a rotary-to-linear motion translator, said rotary gear having defined therein a direction of rotation thereof a plurality of position regulating portions corresponding to the stop and reproducing positions and a toothless portion disengageable from the gear means, said rotary gear also having a cam portion defined therein at a location between the stop and reproducing positions and being biased so as to rotate; an operating solenoid unit; a first actuating lever having an engagement means detachably engageable with the position regulating portions to permit the gear means to be aligned with the toothless portion, the engagement means being biased in a stopping direction, the first actuating lever being operatively associated with the solenoid unit to rotate to thereby cause the engagement means to disengage from the position regulating means; a second actuating lever operatively coupled with the solenoid unit through the first actuating lever, the second actuating lever having an engagement means engageable with the cam portion when pivoted in driving association with the solenoid unit through the first actuating lever, the engagement means of the second actuating lever being angularly moved in a direction conforming to the direction of rotation of the rotary gear after having been pressed to the cam portion by the rotation of the rotary gear; a cassette holder for supporting a cassette and movable between a play position, in which the cassette confronts the magnetic recording and/or reproducing head, and an eject position in which the cassette is spaced from the play position; and a holding member detachably engageable with the cassette holder when the latter is in the play position and drivingly associated with a pivot motion of the second actuating lever caused by the cam portion to release the cassette holder.

According to another aspect of the present invention, there is provided a cassette loading apparatus for a cassette tape recorder of a type including a head carrier carrying a magnetic recording and/or reproducing head and movable between stop and reproducing positions in a direction confronting a front face of the magnetic recording and/or reproducing head, which apparatus comprises a drive motor for driving a cassette tape recorder mechanism; a solenoid unit for controlling various operating conditions of the cassette tape recorder; a cam gear having a toothless portion and operatively associated with various operating elements of a tape recorder mechanism; a connecting means having first and second ends opposite to each other, the first end of the connecting means being coupled with the solenoid unit whereas the second end of the connecting means is engageable with the cam gear, said connecting means being operable to regulate a position of the cam gear so that a rotational force of the connecting means may be selectively transmitted to the cam gear; a first slidable member supported on a chassis for sliding movement in two directions opposite to each other and engageable with the connecting means, said first slidable member having a first engagement formed therein; a first biasing means for biasing the first slidable member with a biasing force of a magnitude greater than a force of attraction of the solenoid unit; a cassette holder for supporting a tape cassette and movable between a play position and an eject position, said cassette holder having a second engagement formed therein; a second slidable member supported by the cassette holder for movement two directions opposite to each other; and a second biasing means for biasing the second slidable member with a biasing force of a magnitude greater than that of the first biasing means. When the first slidable member is engaged with the connecting means while the cassette holder is held at the eject position, an attracting operation of the solenoid unit during supply of an electric power to the solenoid unit is disabled. During the pivotal movement of the cassette holder from the eject position towards the play position, the second slidable member and the second engagement of the cassette holder are engaged with the first slidable member and the first engagement of the first slidable member, respectively, so that when a reactive force of the first and second biasing means acts on a point of engagement between the first and second slidable members as a result of the pivotal movement of the cassette holder from the eject position towards the play position, the first engagement of the first slidable member is engaged with the second engagement of the cassette holder to inhibit a sliding motion of the first slidable member. The reactive force on the point of engagement acts at this time on the second slidable member to allow the second slidable member to undergo a sliding motion, that is, an attracting action of the solenoid unit during the supply of an electric power thereto is inhibited by regulating the position of the slidable member. Also, the engagement between the respective first and second engagements of the first slidable member and the cassette holder can be released when the cassette holder is pivoted to the play position, to allow the first slidable member to slide together with the second slidable member by a biasing force of the second biasing means through the second slidable member to thereby disengage the first slidable member from the connecting means to allow the solenoid unit to undergo the attracting operation during the supply of the electric power thereto.

Preferably, when the cassette holder is pivoted to the play position with the first engagement of the first slidable member disengaged from the second engagement of the cassette holder and the first slidable member is slidingly moved to a position where the attracting operation of the solenoid unit during the supply of the electric power thereto is enabled, the second engagement of the cassette holder is held by the first engagement of the first slidable member to thereby continuously hold the cassette holder at the play position.

The connecting means may include a first actuating lever coupled at one end with the solenoid unit and at the other end adapted to regulate the position of the cam gear for selectively transmitting the rotational force of the drive motor to the cam gear, and a second actuating lever formed with a third engagement engageable with the first slidable member and also engageable with the am portion of the cam gear at a predetermined position generally intermediate between a reproducing or fast feed position of the tape recorder mechanism and a stop position of the tape recorder mechanism. In this case, the third engagement of the second actuating lever is displaced to a position ready to engage with the cam portion of the cam gear through the first actuating lever when the solenoid unit is in a condition to attract during the cam gear positioned at the predetermined position while the cassette holder is held at the play position. The second actuating lever is then pivoted in response to rotation of the cam gear to cause the second actuating lever to engage with the first slidable member. The first slide member is slide as a result of an amount of displacement of the second actuating lever to thereby release the cassette holder, then held at the play position by the first engagement of the first slidable member, from the play position, but the third engagement of the second actuating lever is brought to a position non-engageable with the cam portion of the cam gear when the solenoid unit is released.

According to the present invention, with the cassette loading apparatus so constructed as hereinabove described, at the predetermined position halfway during the rotation of the cam gear 7 from the reproducing position or the fast feed position towards the stop position, selection of the attraction of the solenoid unit 8 is performed. Specifically, if the solenoid unit 8 is in position to attract, the cassette eject operation is initiated, but if the solenoid unit 8 is released, the tape recorder mechanism is brought into the stop position. According to this design, the cassette eject operation can readily be initiated from the reproducing or fast feed position, making it possible to provide the cassette loading apparatus having a semi-automatic cassette ejecting capability, which is compact in size and has a light-weight feature and which exhibits a favorable operativity.

Specifically, the cassette loading apparatus is so designed that during the cassette holder is held at and being pivoted from the open position (the cassette eject position) towards the closed position (the tape play position), the start of the tape recorder mechanism is inhibited by the attracting block of the solenoid unit, but when the cassette holder is moved to the closed position at which the attracting operation of the solenoid unit is available, the tape recorder mechanism can be operated only if the tape cassette is loaded at a regular position to be attained when the tape recorder mechanism plays. Accordingly, the tape loading apparatus of the present invention is substantially free from the possibility of the cassette tape and/or the magnetic head being damaged as a result of collision between the magnetic head and the tape cassette during the movement of the head carrier plate and/or abnormalities or troubles resulting from a blocking of the rotation of the motor. Thus, with the present invention, it is possible to increase the mounting reliability and stability when the tape cassette is to be loaded onto the tape recorder mechanism. In addition, since no collision occur between the magnetic head and the tape cassette, the necessity of mounting the magnetic head on an additional member above the head carrier plate and that of use of additional mechanism parts for avoiding a considerable change in load on the drive motor is eliminated, making it possible to assembly the compact, light-weight and easy-to-operate cassette loading apparatus in a high quality, with a high reliability and at a reduced cost.

Also, the cassette loading apparatus of the present invention can be so configured as to have a semi-automatic cassette ejection type in which the apparatus is electrically driven automatically only when the cassette holder is opened, but manually when the cassette holder is closed. Therefore, the present invention is effective to provide the compact, easy-to-operate semi-automatic cassette loading apparatus of a high quality, with a high reliability and at a reduced cost.

BRIEF DESCRIPTION OF THE DRAWINGS

This and other objects and features of the present invention will become clear from the following description taken in conjunction with preferred embodiments thereof with reference to the accompanying drawings, in which like parts are designated by like reference numerals and in which.

DETAILED DESCRIPTION OF THE EMBODIMENT

Figure 1:
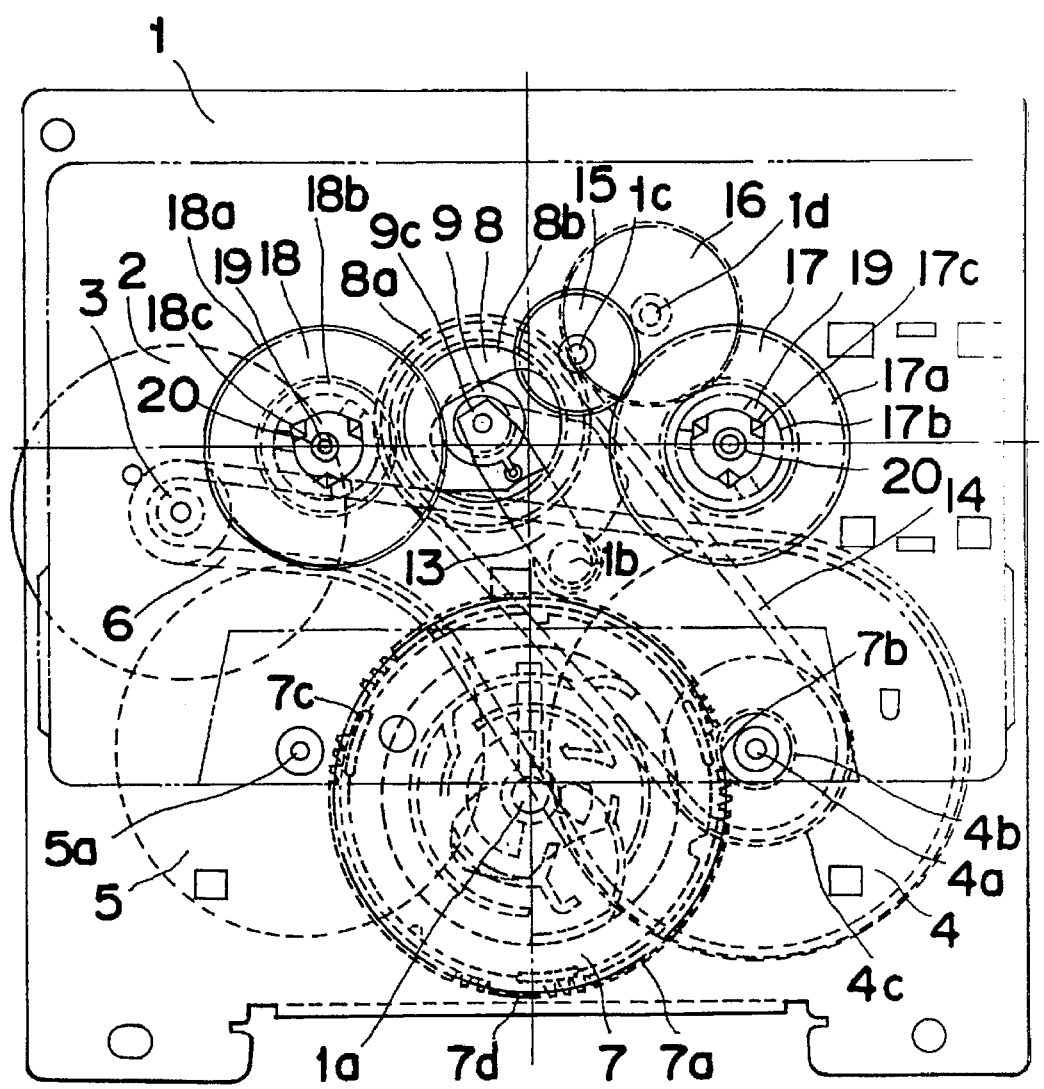
FIG. 1 is a schematic plan view showing various component parts of a cassette tape recorder in which a cassette loading apparatus of the present invention is incorporated.
Figure 2:
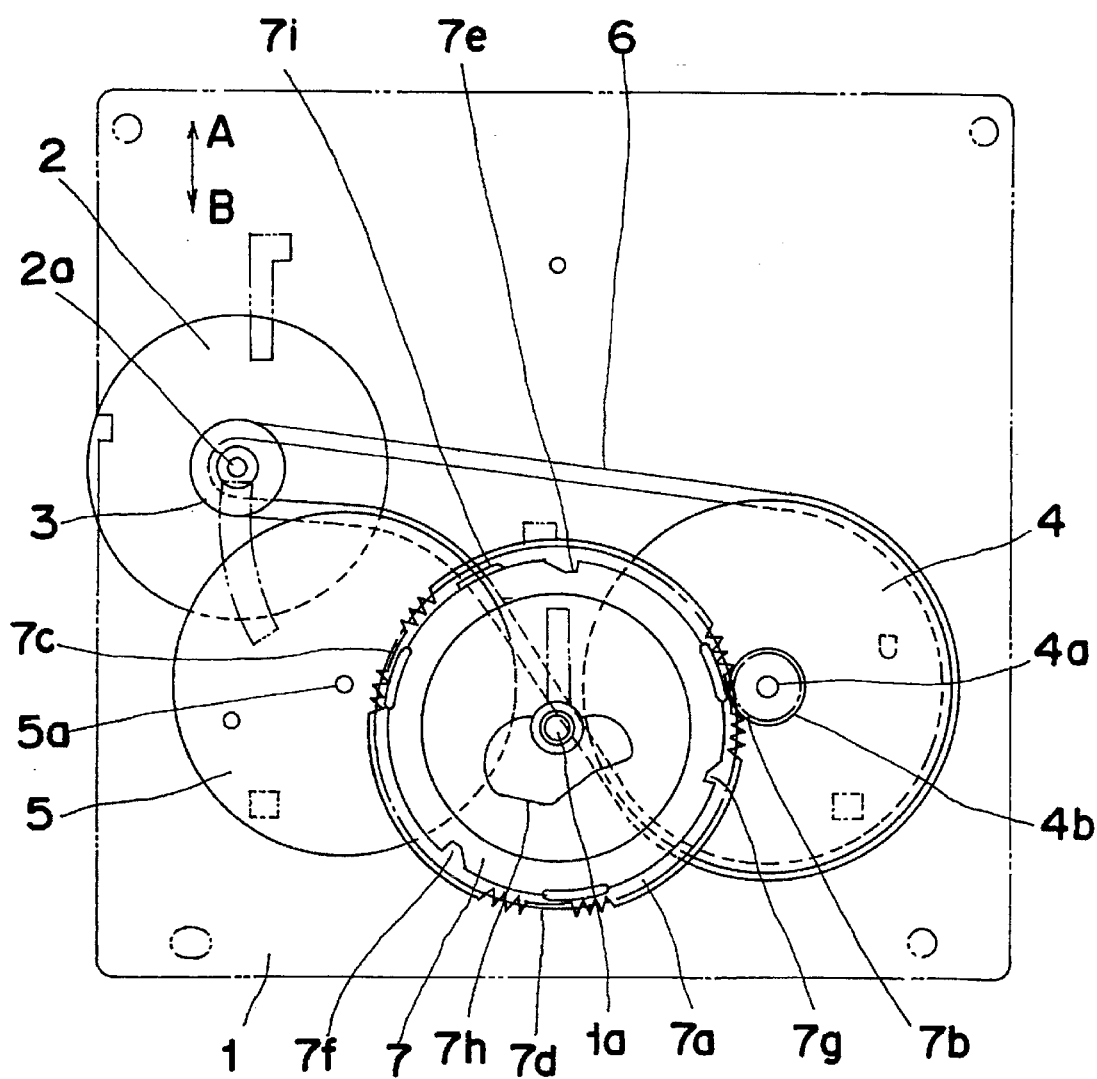
FIG. 2 is a schematic plan view of the cassette loading apparatus.

Referring now to FIGS. 1 to 23, a cassette loading system according to the present invention includes an electric drive motor 2 fixedly mounted on a generally rectangular chassis 1 and having a drive shaft 2a onto which a motor pulley 3 press-fitted for rotation together therewith, a first capstan 4a onto which a first flywheel 4 having a pinion gear 4b coaxially integral therewith is press-fitted for rotation together therewith, and a second capstan 5a onto which a second flywheel 5 is press-fitted for rotation together therewith. The motor pulley 3 and the first and second flywheels 4 and 5 are drivingly coupled with an endless capstan belt 6 so that a counterclockwise drive of the drive motor 2 can be transmitted to the first and second flywheel 4 and 5.

A cam gear 7 having its outer peripheral portion formed with a toothed portion 7a, toothless portions 7b, 7c and 7d, engagements 7e, 7f and 7g and cam portions 7h and 7i is mounted on the chassis 1 for rotation about a support pin 1a. This cam gear 7 is so designed that although when the pinion gear 4b integral with the first flywheel 4 then driven in a counterclockwise direction is meshed with the toothed portion 7a the cam gear 7 can be driven in a clockwise direction, no rotational force of the first flywheel 4 will not be transmitted to the cam gear 7 when any one of the toothless portions 7b, 7c and 7d is held in position to align with the pinion gear 4b. This cam gear 7 is also so designed that when any one of the toothless portions 7b, 7c and 7d is held in position to align with the pinion gear 4b, the cam gear 4 is biased by a suitable biasing means (not shown) so as to rotate in the clockwise direction.

A solenoid unit 8 having a plunger 8a movable between projected and retracted positions is fixedly mounted on the chassis 1. The plunger 8a is driven from the projected position towards the retracted position when the solenoid unit 8 is electrically energized. A trigger lever 9 is supported by a pivot pin 1b on the chassis 1 for pivotal movement about the pivot pin 1b and is formed with a coupling member 9a for connection with the plunger 8a of the solenoid unit 8, a stopper 9b for selective engagement with one of the engagements 7e, 7f and 7g of the cam gear 7 to regulate the position of the cam gear 7, and an engagement 9c engageable with a pawl 10a of an eject lever 10.

The eject lever 10 referred to above is supported by a pivot pin 1c on the chassis 1 for pivotal movement about the pivot pin 1c and is formed with, in addition to the pawl 10a engageable with the engagement 9c of the trigger lever 9, an engagement pin 10b engageable with an engagement 11c of an eject rod 11, and an engagement 10c engageable with the cam portion 7i of the cam gear 7. The eject rod 11 has hooks 11a and 11b formed integrally therewith and is mounted on the chassis 1 with the hooks 11a and 11b retained in guide slots 1d and 1e defined in the chassis 1. This eject rod 11 so supported is for reciprocating movement in a direction shown by the arrow A and B.

A first torsion spring 12 is mounted on the chassis 1 and is connected at one end with a retainer 1f integral with the chassis 1 and at the opposite end with a retainer 9d of the trigger lever 9 so that the trigger lever 9 can be biased clockwise with an abutment 9e of the trigger lever 9 held in contact with a stopper 1g fast with the chassis 1. A second torsional spring 13 is similarly mounted on the chassis 1 and is connected at one end with a retainer 1h integral with the chassis 1 and at the opposite end with a retainer 10d of the eject lever 10 so that the eject lever 10 can be biased counterclockwise with an abutment 10e fast with the eject lever 10 held in contact with a stopper 1i fast with the chassis 1.

A third torsional spring 14 is also mounted on the chassis and is connected at one end with a retainer 1j of the chassis 1 and at the other end with a retainer 11d of the eject rod 11 so that the eject rod 11 can be normally biased in the direction shown by the arrow B so as to allow the engagement 11c of the eject rod 11 to be engaged with the engagement pin 10b of the eject lever 10.

The chassis 1 has a head carrier plate 15 mounted thereon. This head carrier plate 15 is formed with guide holes 15a, 15b and 15c into which associated guide pieces 1k, 1l, 1m integral with the chassis 1 are movably engaged so that the head carrier plate 15 can slide in one of opposite directions shown by the arrows A and B, respectively. This head carrier plate 15 also has an engagement pin 15d engageable with the cam portion 7h of the cam gear 7. A head block 16 including a magnetic recording and/or reproducing head 16a is fixedly mounted on the head carrier plate 15.

Reference numeral 17 represents a spring supported on the chassis 1 with one end thereof fixed to a retainer 1 n of the chassis 1 and with the other end retained by a retainer 15d of the head carrier plate 15 so as to bias the head carrier plate 15 normally in the direction shown by the arrow B with the guide holes 15a, 15b and 15c in the head carrier plate 15 brought into engagement with the associated guide pieces 1k, 1l and 1m. Reference numeral 18 represents a cassette holder that is pivotable in opposite directions shown respectively by the arrows C and D about a support pin 18a. This cassette holder 18 is used to hold a tape cassette 19 and is formed with a projection 18d which is engageable with a barrier 11e of the eject rod 11d during the pivotal movement of the cassette holder 18 from an open position (a cassette eject position) towards a closed position (a tape play position) and is also engageable with a retainer 11f of the eject rod 11 when the cassette holder 18 is in the closed position. This cassette holder 18 is normally biased by a suitable biasing means (not shown) such as, for example, a spring so as to pivot towards the cassette eject position in the direction shown by the arrow D.

The cassette holder 18 includes a slide plate 20 having a guide hole 20a in which a guide 18c formed on the cassette holder 18 is retained. This slide plate 20 is slidable in opposite directions shown respectively by the arrows E and F with the guide 18c moving within the guide hole 20a and is formed with an engagement 20b that is engageable with an inclined edge 11g of the eject rod 11 during the pivotal movement of the cassette holder 18 from the open position (the cassette eject position) towards the closed position (the tape play position). This slide plate 20 is normally biased in the direction shown by the arrow F by a coil spring 21, carried by the cassette holder 18 with one end thereof fixed to a retainer 18d and the other end retained by a retainer 20c of the slide plate 20, so that the guide hole 20a in the slide plate 20 can be engaged with the guide 18c of the cassette holder 18 to thereby regulate the position of the slide plate 20 with respect to the direction shown by the arrow F.

The cassette loading apparatus of the construction described above in accordance with the present invention operates in the following manner.

Figure 3:
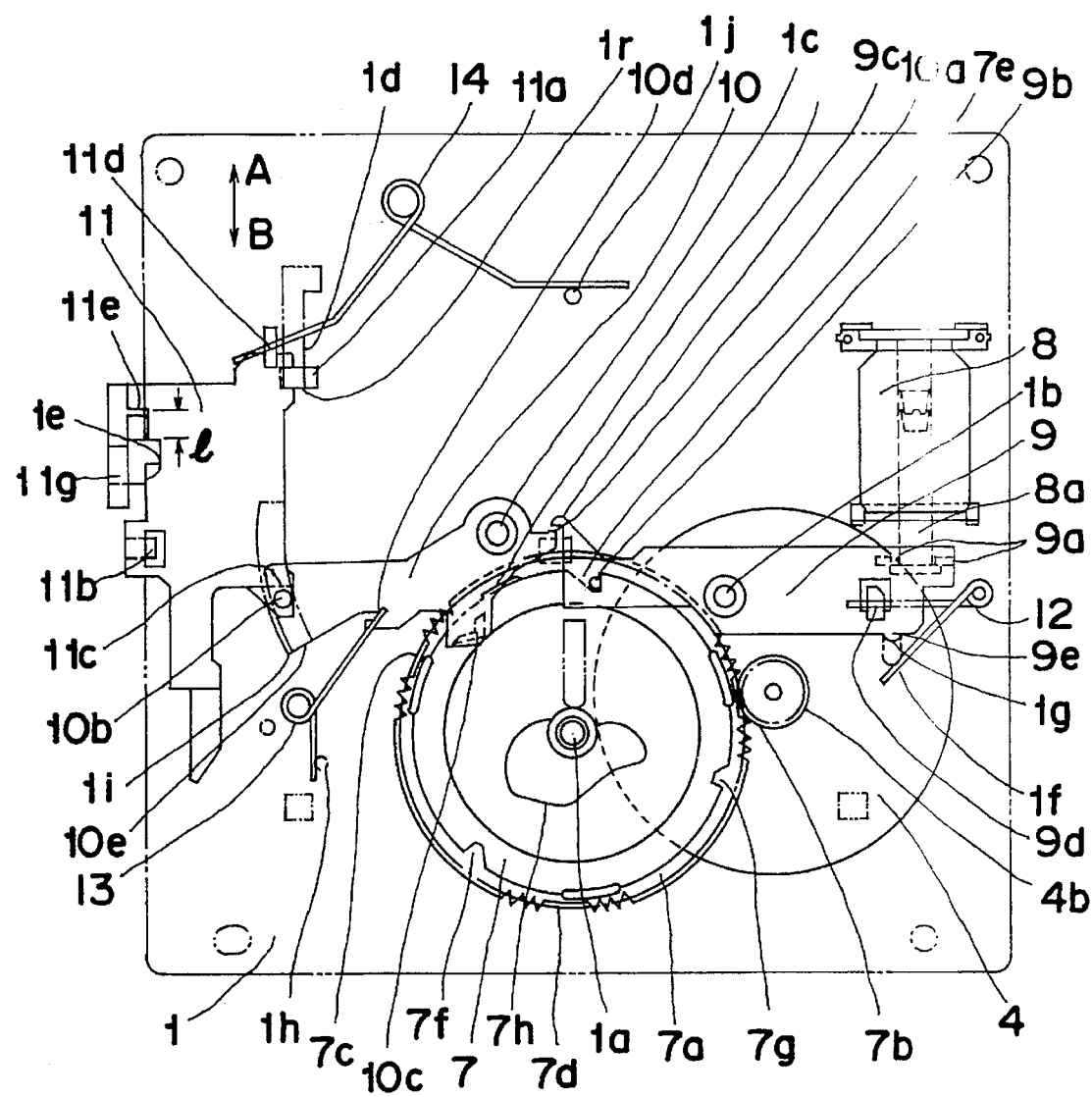
FIG. 3 is a schematic plan view of the cassette loading apparatus showing the component parts held in position when a cassette holder is in an open position.
Figure 4:
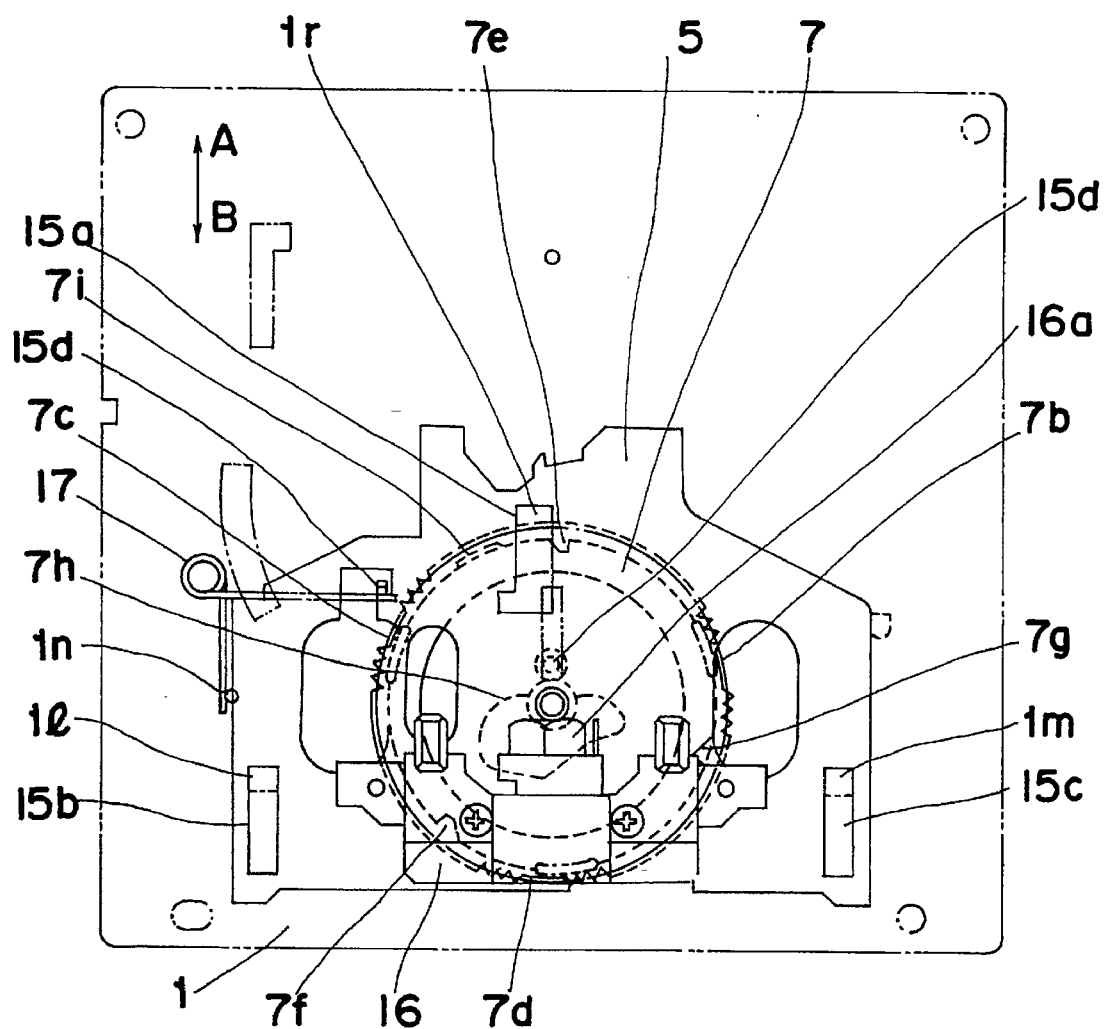
FIG. 4 is a schematic plan view of the cassette loading apparatus, showing a head carrier plate held in position when the cassette holder is in the open position.
Figure 5:
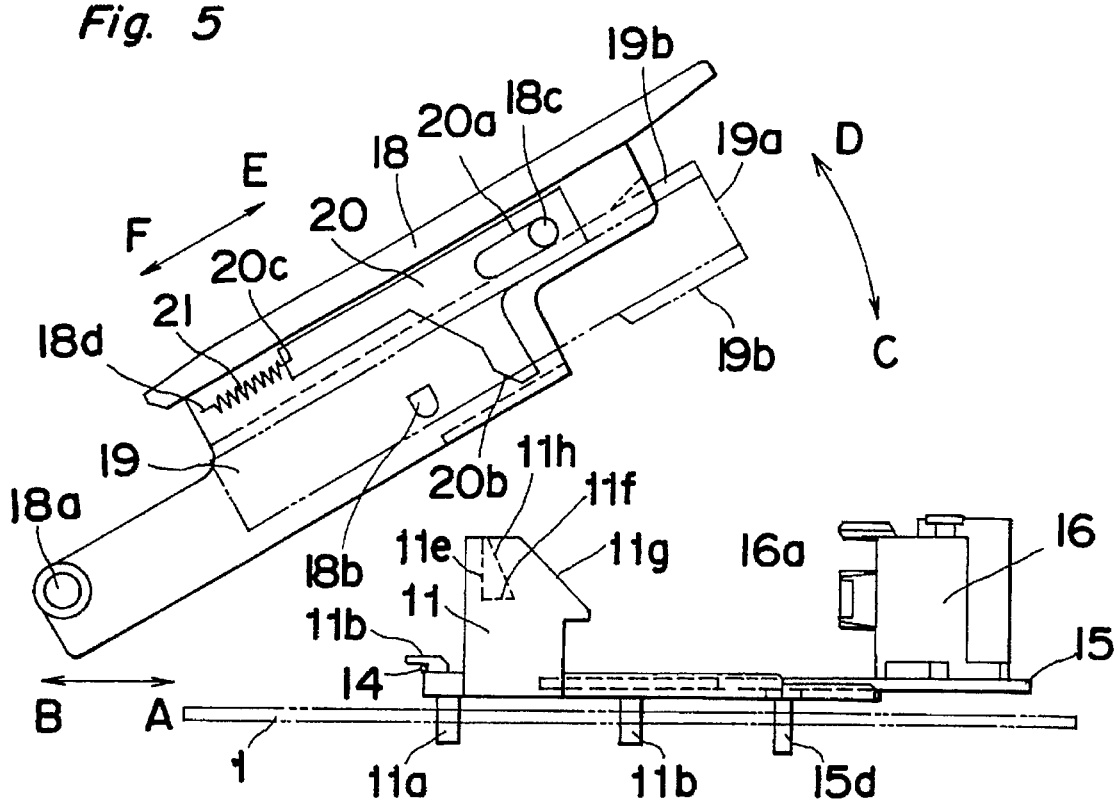
FIG. 5 is a schematic side view of the cassette loading apparatus, showing the various component parts held in position when the cassette holder is in the open position as shown in FIGS. 3 and 4.
Figure 7:
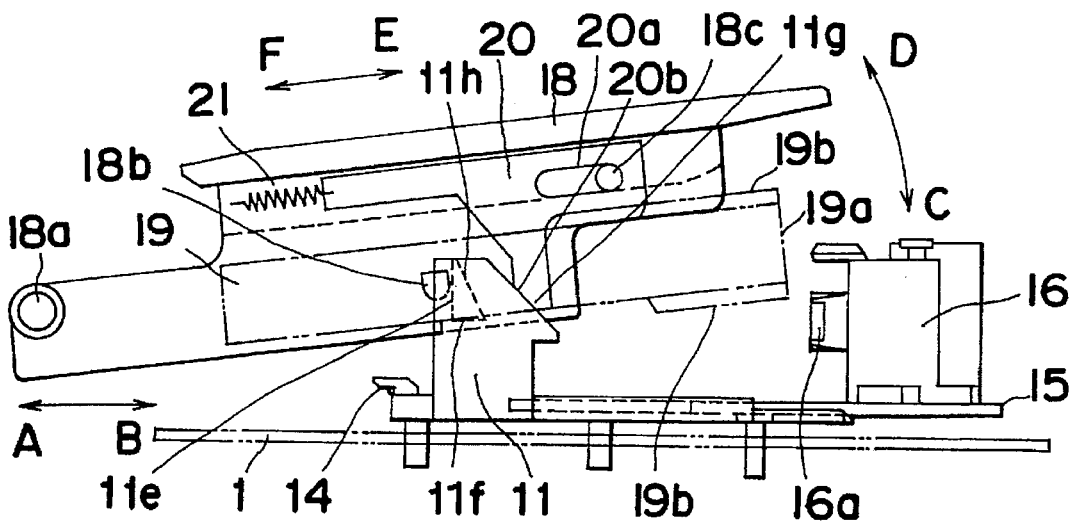
FIGS. 7 to 9 are schematic side views of the cassette loading apparatus, showing the cassette holder being pivoted from the open position towards a closed position past an intermediate position, respectively.

FIGS. 3 to 5 illustrates the cassette holder 18 held in the open position (the cassette eject position). Assuming that the cassette holder 18 is in the open position and when the drive motor 2 is subsequently powered on to produce a rotational drive in a counterclockwise direction, this counterclockwise rotational drive is transmitted to the first flywheel 4 to drive the latter in the counterclockwise direction. Since at this time the engagement 7e of the cam gear 7 is engaged with the stopper 9b of the trigger lever 9 and the toothless portion 7b of the cam gear is aligned with the pinion gear 4b of the first flywheel 4, no rotational force of the first flywheel 4 is transmitted to the cam gear 7. Starting from this condition, and when the solenoid unit 8 is electrically energized, the plunger 8a of the solenoid unit 8 is moved from the projected position towards the retracted position in the direction shown by the arrow A, accompanied by a counterclockwise rotation of the trigger lever 9, connected with the plunger 8a, against the spring 12.

During the counterclockwise movement of the trigger lever 9, the engagement 9c of the trigger lever 9 is engaged with the pawl 10a of the eject lever 10 to pivot the eject lever 10 in the clockwise direction. Simultaneously with the eject lever 10 receiving from the trigger lever 9 a pushing force tending to pivot the eject lever 10 in the clockwise direction, the engagement pin 10b of the eject lever 10 is engaged with the engagement 11c of the eject rod 11 and, accordingly, a pushing force exerted by the spring 14 used to bias the eject rod 11 in the direction shown by the arrow B acts on the eject lever 10 to bias the latter in the counterclockwise direction. Since the pushing force of the spring 14 tending to pivot the eject lever 10 counterclockwise is chosen to be higher than the pushing force transmitted from the trigger lever 9 to the eject lever 10 to pivot the latter clockwise, the eject lever 10 will not be moved by the pivotal movement of the trigger lever 9, that is, a force of attraction of the solenoid unit 18, but is regulated in position by the pushing force of the spring 14 transmitted thereto through the engagement 11c of the eject rod 11.

Since the position of the eject lever 10 is regulated in the manner described above, the trigger lever 9 is no longer pivotable counterclockwise once the engagement 9c of the trigger lever 9 is brought into contact with the pawl 10a of the eject lever 10 and, hence, retraction of the plunger 8a of the solenoid 8 in the direction shown by the arrow A is then halted. This condition is shown in FIG. 6.

Figure 6:
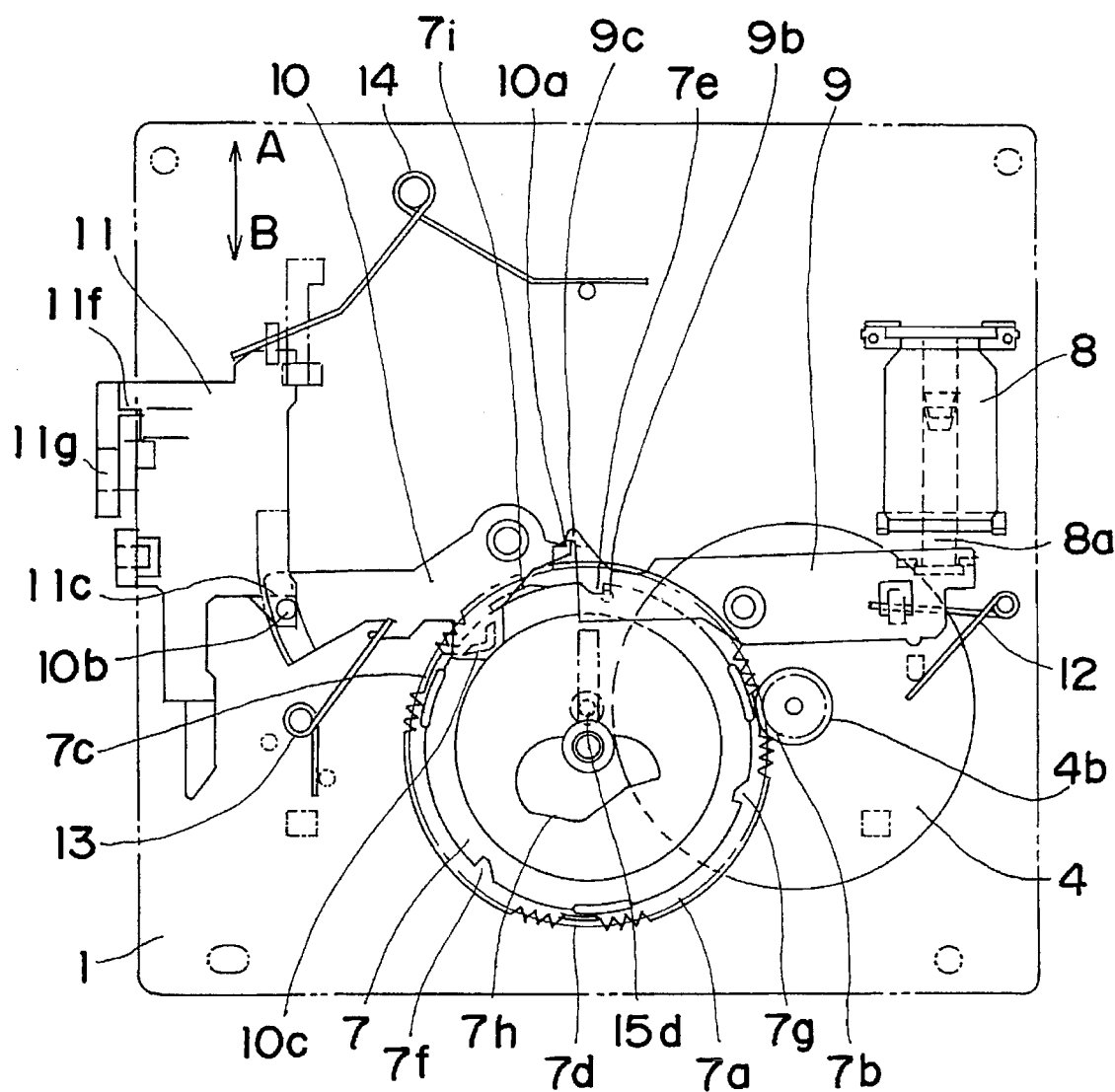
FIG. 6 is a schematic plan view of the cassette loading apparatus, showing a solenoid unit electrically energized.

Referring to FIG. 6, since as hereinabove described, the biasing force of the spring 14 acting in the direction shown by the arrow B regulates the position of the eject lever 10 through the eject rod 11 and also prevents the trigger lever 9 from pivoting counterclockwise, the plunger 8a of the solenoid unit 8 is halted halfway towards the retracted position in the direction shown by the arrow A even though the solenoid unit 8 is still electrically energized, that is, even though an electric power is being supplied to the solenoid unit 8. For this reason, during this condition, the stopper pin 9b of the trigger lever 9 is not disengaged from the engagement 7e of the cam gear 7 and, accordingly, the toothless portion 7b of the cam gear 7 remains in alignment with the pinion gear 4b of the first flywheel 4 without being engaged with the pinion gear 4b of the first flywheel 4. In other words, so long as the cassette holder 18 is in the open position, not only can the cam gear 7 be driven, but also driving elements for not only the head carrier plate 15, but also a reversible transport switching mechanism (not shown) can be operated, and accordingly, a tape recorder mechanism cannot be started.

When the cassette holder 18 is manually pivoted towards the closed position (the tape play position) in the direction shown by the arrow C, a projection 18b integral with the cassette holder 18 is brought into contact with the barrier 11e of the eject rod 11 and, at the same time, the engagement 20b of the slide plate 20 slidably carried by the cassette holder 18 slidingly engages the inclined edge 11g of the eject rod 11. As the cassette holder 18 is further pivoted towards the closed position in the direction shown by the arrow C with the engagement 20b sliding downwardly along the inclined edge 11g of the eject rod 11, the eject rod 11 and the slide plate 20 appear to be moved in the respective directions shown by the arrows B and F against the associated biasing forces of the springs 1 and 21, but only the eject rod 11 is disabled to move in the direction shown by the arrow A since the barrier 11e of the eject rod 11 is held in abutment with the projection 18b of the cassette holder 18, allowing the slide plate 20 to move in the direction shown by the arrow E against the biasing force of the spring 21.

Figure 8:
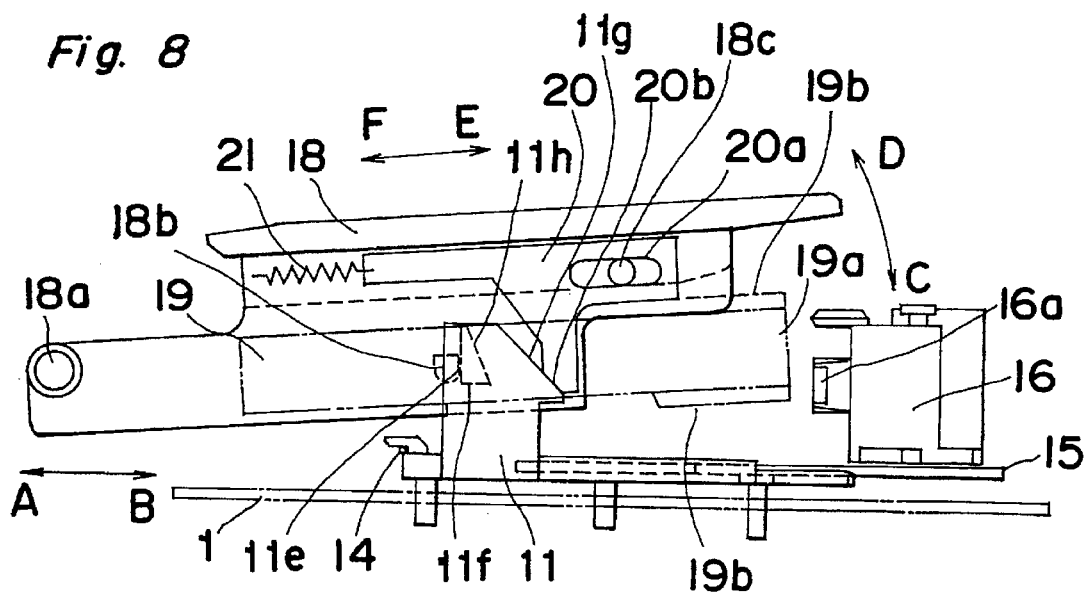
Figure 9:
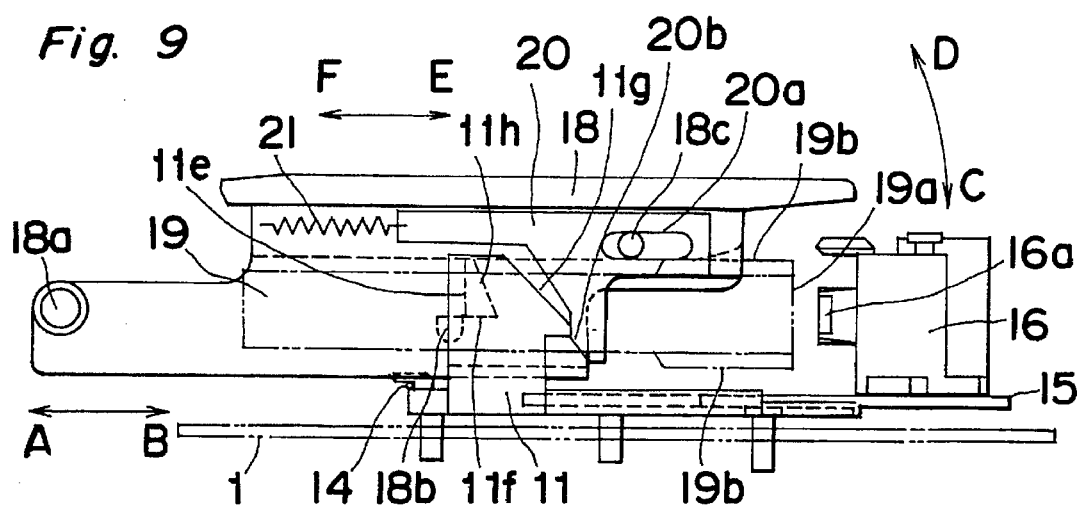
Figure 10:
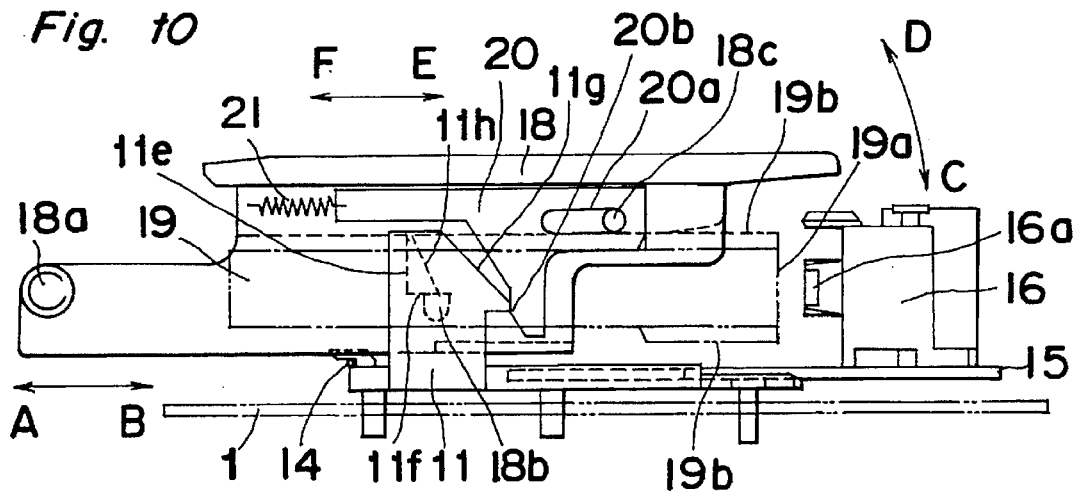
FIG. 10 is a schematic side view of the cassette loading apparatus, showing the cassette holder held at the closed position.

Conditions of the cassette holder 18 subsequent to the condition shown in and described with reference to FIG. 8 and until the cassette holder 18 is brought to the closed position are sequentially shown in FIG. 9 and 10. When the cassette holder 18 is manually pivoted to a position approaching the closed position as shown in FIG. 9, the barrier 11e of the eject rod 11 is disengaged from the projection 18b of the cassette holder 18, permitting the eject rod 11 to be ready to slide. Since the biasing force of the spring 21 urging the slide plate 20 in the direction shown by the arrow F is chosen to be higher than the biasing force of the spring 14 urging the eject rod 11 in the direction shown by the arrow B, the eject rod 11 is slidingly moved by the biasing force of the spring 21 together with the slide plate 20 in the direction shown by the arrow A until the guide hole 20a in the slide plate 20 is brought into abutment with the guide piece 18c of the cassette holder 18. As a result thereof, the retainer 11f of the eject rod 11 is engaged with the projection 18b of the cassette holder 18 as shown in FIG. 10, with the cassette holder 18 consequently held in the closed position, that is, held at the tape play position. The various component parts of the cassette mechanism at the time the cassette holder 18 is moved to the closed position are shown in a plan view in FIG. 11, it being however to be noted that in FIG. 11 the cassette holder 18 is not depicted for the sake of clarity.

With the cassette holder 18 retained at the tape play position, the eject rod 11 is displaced in the direction shown by the arrow A by the effect of a pushing force of a magnitude equal to the difference between the respective biasing forces of the springs 14 and 21 that is transmitted thereto through the slide plate 20. More specifically, assuming that the position of the eject rod 11 from a reference line while the cassette holder 18 is in the open position as shown in FIGS. 3 to 6 is expressed by 1, and the position of the eject rod 11 from the reference line while the cassette holder 18 is held at the closed position is expressed by m, the relationship of 1<m can be established. In other words, when the cassette holder 18 is in the closed position, the eject rod 11 engages and holds the cassette holder 18 at a position displaced only (m−1) in the direction shown by the arrow A relative to that attained when the cassette holder 18 is in the open position.

Figure 11:
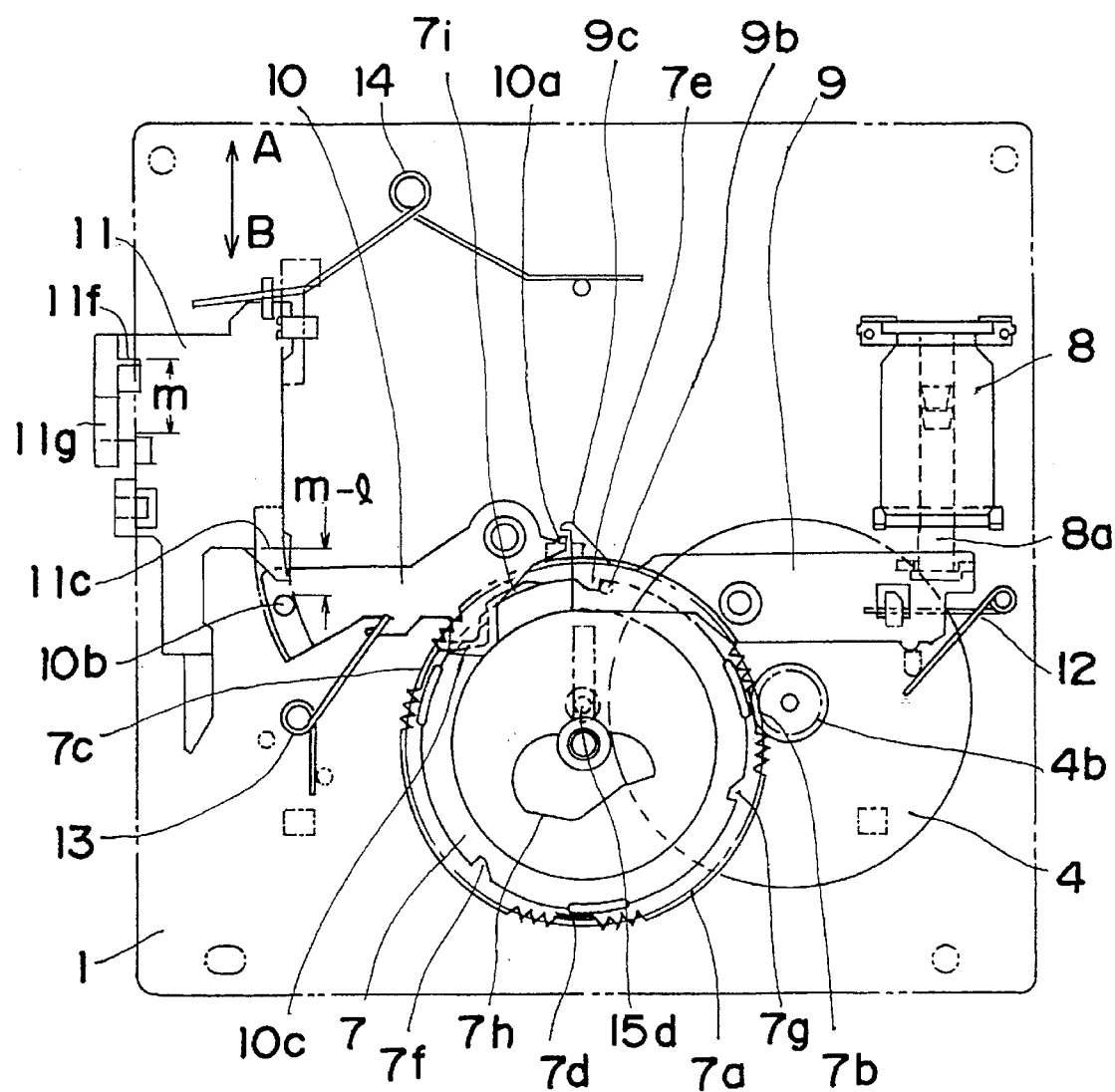
FIG. 11 is a schematic plan view of the cassette loading apparatus showing respective positions of the various component parts when a cassette mechanism is held at a stop position while the cassette holder is at the closed position.
Figure 12:
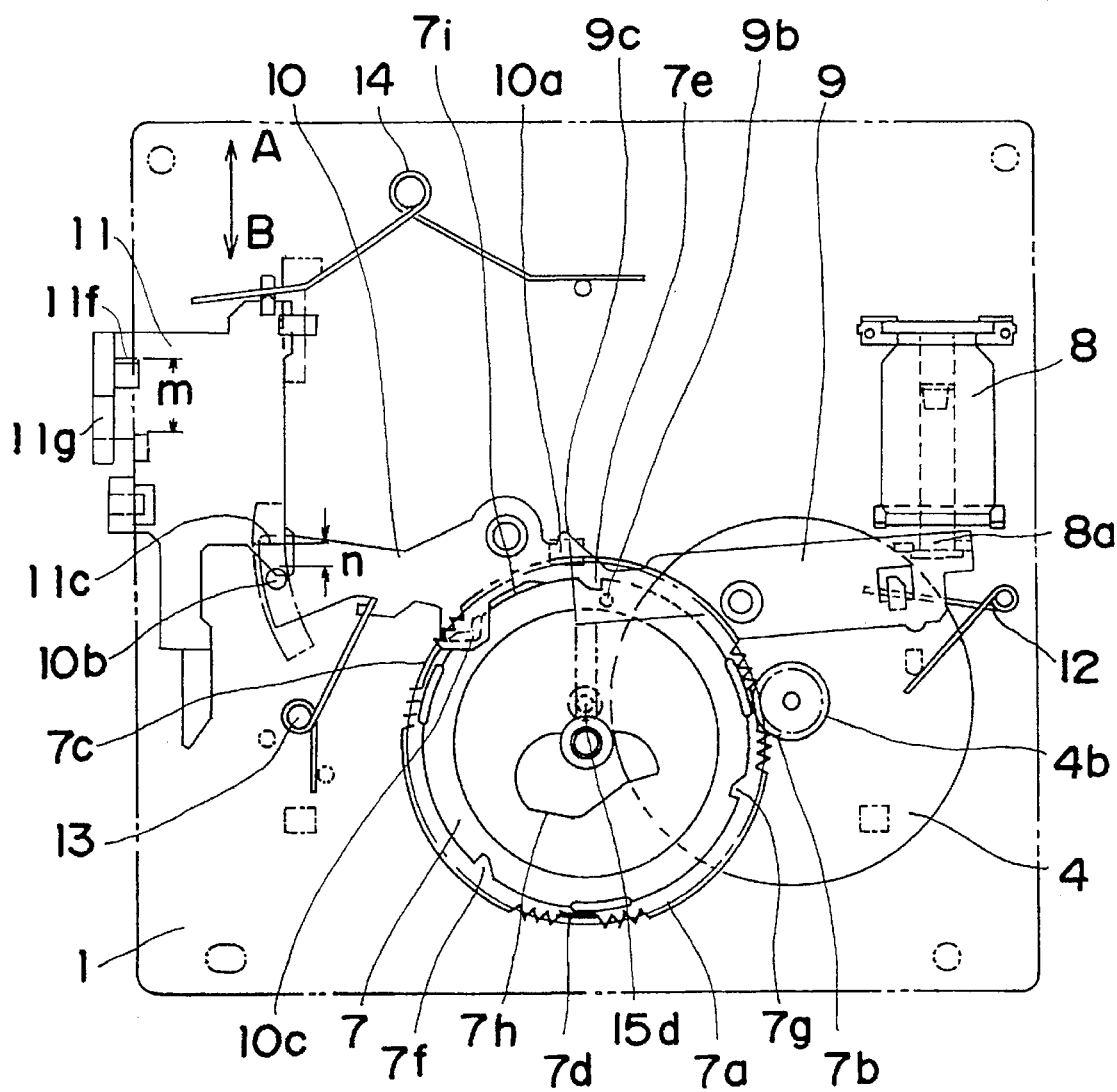
FIG. 12 is a view similar to FIG. 11, showing the cassette loading apparatus with a plunger of the solenoid unit completely retracted to a retracted position.

The condition in which the solenoid unit 8 is powered on after the tape recorder mechanism is halted with the cassette holder 18 held in the closed position as shown in FIG. 11 is shown in FIG. 12, the operation of which will now be described.

When the drive motor 2 is electrically powered on subsequent to the release of the solenoid unit 8 as shown in FIG. 11, the drive motor produces a counterclockwise rotational force. Since at this time the engagement 7e of the cam gear 7 is engaged with the stopper pin 9b of the trigger lever 9 and the toothless portion 7b is aligned with the pinion gear 4b of the first flywheel 4, no rotational force of the first flywheel 4 is transmitted to the cam gear 7. Starting from this condition, and when the solenoid unit 8 is subsequently electrically energized, the plunger 8a of the solenoid unit 8 is retracted towards the retracted position in the direction shown by the arrow A, accompanied by a counterclockwise pivot of the trigger lever 9, connected with the plunger 8a, against the biasing force of the spring 12. During the counterclockwise pivot of the trigger lever 9, the engagement 9c of the trigger lever 9 is brought into engagement with the pawl 10a of the eject lever 10, causing the eject lever 10 to pivot clockwise. Since when the cassette holder 18 is in the closed position the eject rod 11 is displaced (m−1) in the direction shown by the arrow A as hereinbefore described, a clearance of (m−1) is formed between the engagement pin 10b of the eject lever 10 and the engagement 11c of the eject rod 11 and the eject lever 10 is capable of pivoting clockwise against the biasing force of the spring 13.

The maximum stroke of pivot of the eject lever 10 corresponding to the total stroke of attraction of the plunger 8a of the solenoid 8 is smaller than (m−1) at the engagement pin 10b and, even when the plunger 8a is completely moved to the retracted position as shown in FIG. 12, a clearance of n is secured between the engagement pin 10b of the eject lever 10 and the engagement 11c of the eject rod 11. Also, since at the position to which the trigger lever 9 is pivoted when the plunger 8a of the solenoid unit 8 is completely moved to the retracted position as shown in FIG. 11 the stopper 9b of the trigger lever 9 is disengaged from the engagement 7e of the cam gear 7, the am gear 7 biased clockwise is rotated with the toothed portion 7a of the cam gear 7 consequently meshed with the pinion gear 4b of the first flywheel 4 and, accordingly, the counterclockwise rotational force of the first flywheel 4 is transmitted to the cam gear 7 to cause the latter to rotate clockwise. In other words, when the cassette holder 18 is in the closed position, attraction of the solenoid unit 8 makes it possible for the cam gear 7 to be rotated.

As the cam gear 7 is rotated clockwise in the manner described above, the engagement pin 15d of the head carrier plate 15 is engaged with the cam portion 7h of the cam gear 7, causing the head carrier plate 15 to slide in the direction shown by the arrow A along the cam portion 7h as the cam gear 7 is rotated. Simultaneously therewith, the reversible transport switching mechanism and a reversible reel drive mechanism (not shown) both included in the tape recorder mechanism are operated.

Figure 13:
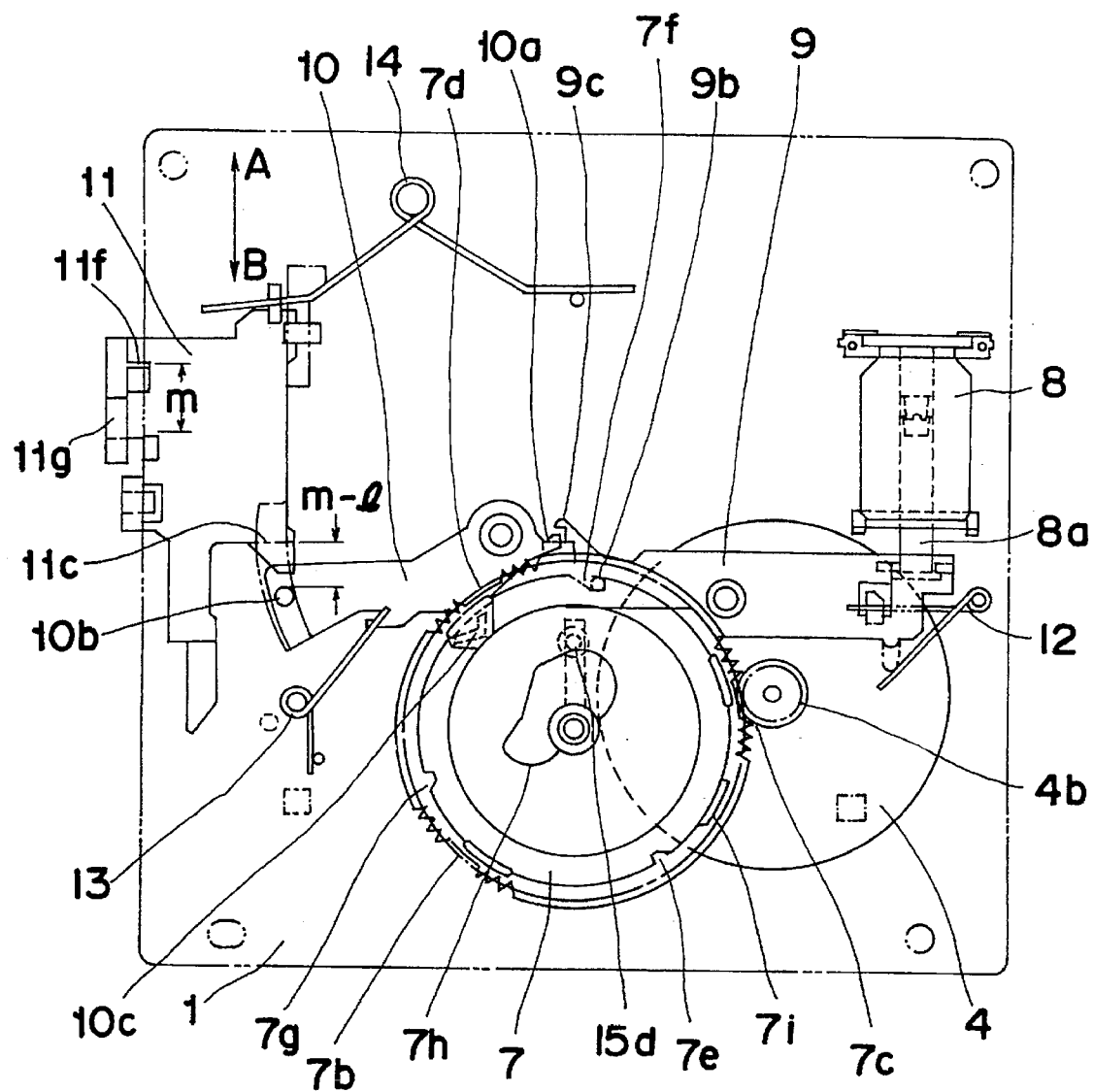
FIG. 13 is a schematic plan view of the cassette loading apparatus, showing the respective positions of the various component parts when the cassette mechanism is held at a reproducing position while the cassette holder is at the closed position.

As the cam gear 7 is further rotated clockwise, the engagement 7f of the cam gear 7 is brought into engagement with the stopper pin 9b of the trigger lever 9 and the toothless portion 7c of the cam gear 7 is aligned with the pinion gear 4b of the first flywheel 4 and, accordingly, the pinion gear 4b of the first flywheel 4 is disengaged from the toothed portion 7a of the cam gear with no rotational force of the first flywheel 4 consequently transmitted to the cam gear 7. This condition represents a tape reproducing position of the tape recorder mechanism, that is, the tape recorder mechanism held in position to reproduce information from the cassette tape and is shown in FIG. 13.

Figure 14:
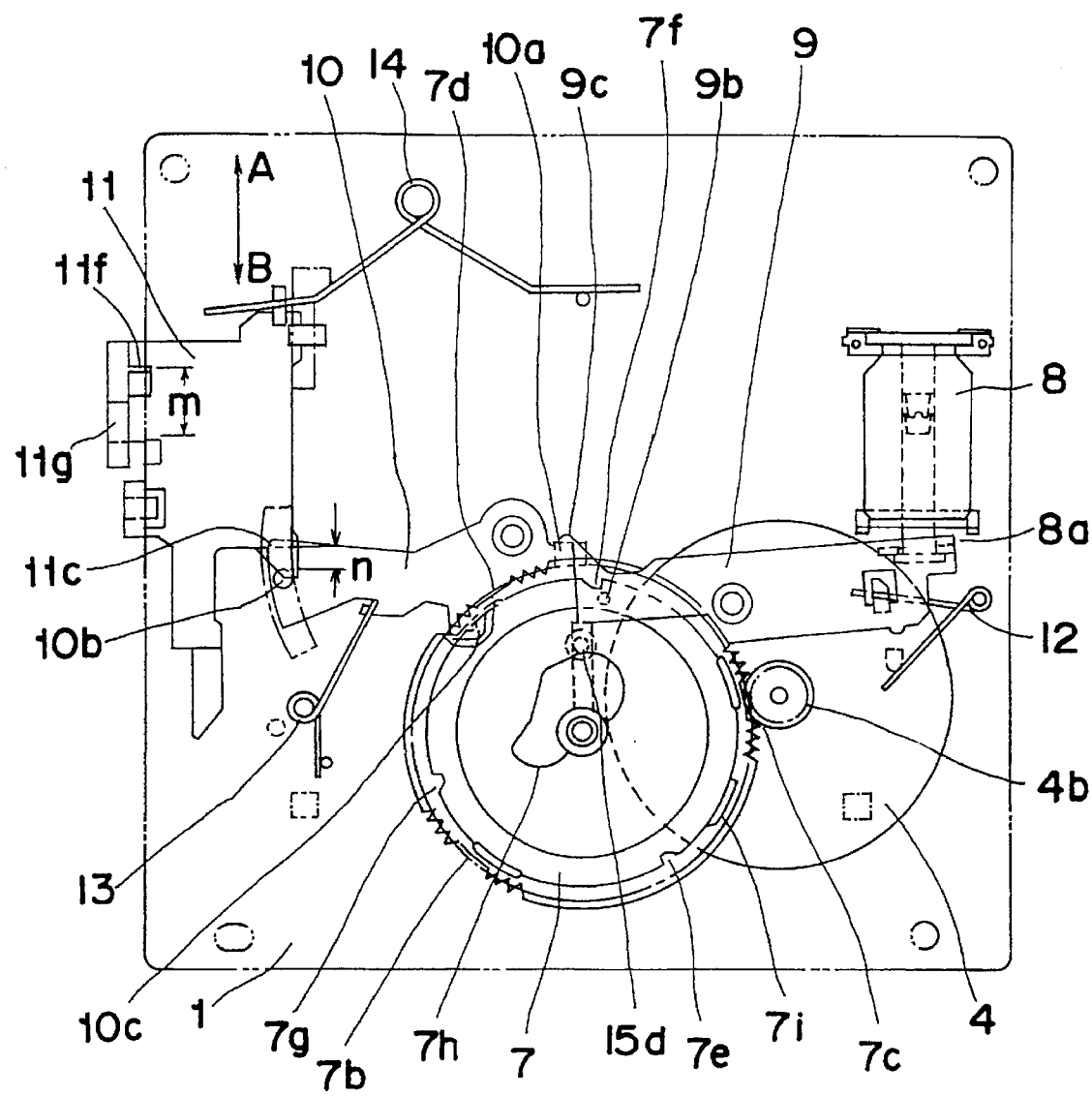
FIG. 14 is a view similar to FIG. 13, showing the solenoid plunger moved completely to the retracted position.

In order for the tape recorder mechanism to be released from the tape reproducing position, the solenoid unit 8 is to be supplied with an electric power to cause the plunger 8a to be moved completely to the retracted position as shown in FIG. 14, accompanied by a counterclockwise pivot of the trigger lever 9 to disengage the engagement 7f of the cam gear 7 from the stopper pin 9b of the trigger lever 9. As is the case when in the stop position, even at the reproducing position the clearance of (m−1) when the solenoid unit 8 is deenergized and the clearance of n when the plunger 8a is moved to the retracted position are secured between the engagement pin 10b of the eject lever 10 and the engagement 11c of the eject rod 11. Also, since at the position to which the trigger lever 9 is pivoted at the time the plunger 8a is completely moved to the retracted position as shown in FIG. 14 the stopper pin 9b is disengaged from the engagement 7f of the cam gear 7, the cam gear 7 biased so as to rotate clockwise undergoes rotation with the toothed portion 7a of the cam gear 7 consequently meshed with the pinion gear 4b of the first flywheel 4. As a result of this, the counterclockwise rotational force of the first flywheel 4 is transmitted to the cam gear 7 and, hence, the cam gear 7 starts its rotation in the clockwise direction. In other words, as is the case when in the stop position, during the cassette holder 18 held in the closed position, the cam gear 7 can be rotated by the attraction of the solenoid unit 8.

Figure 15:
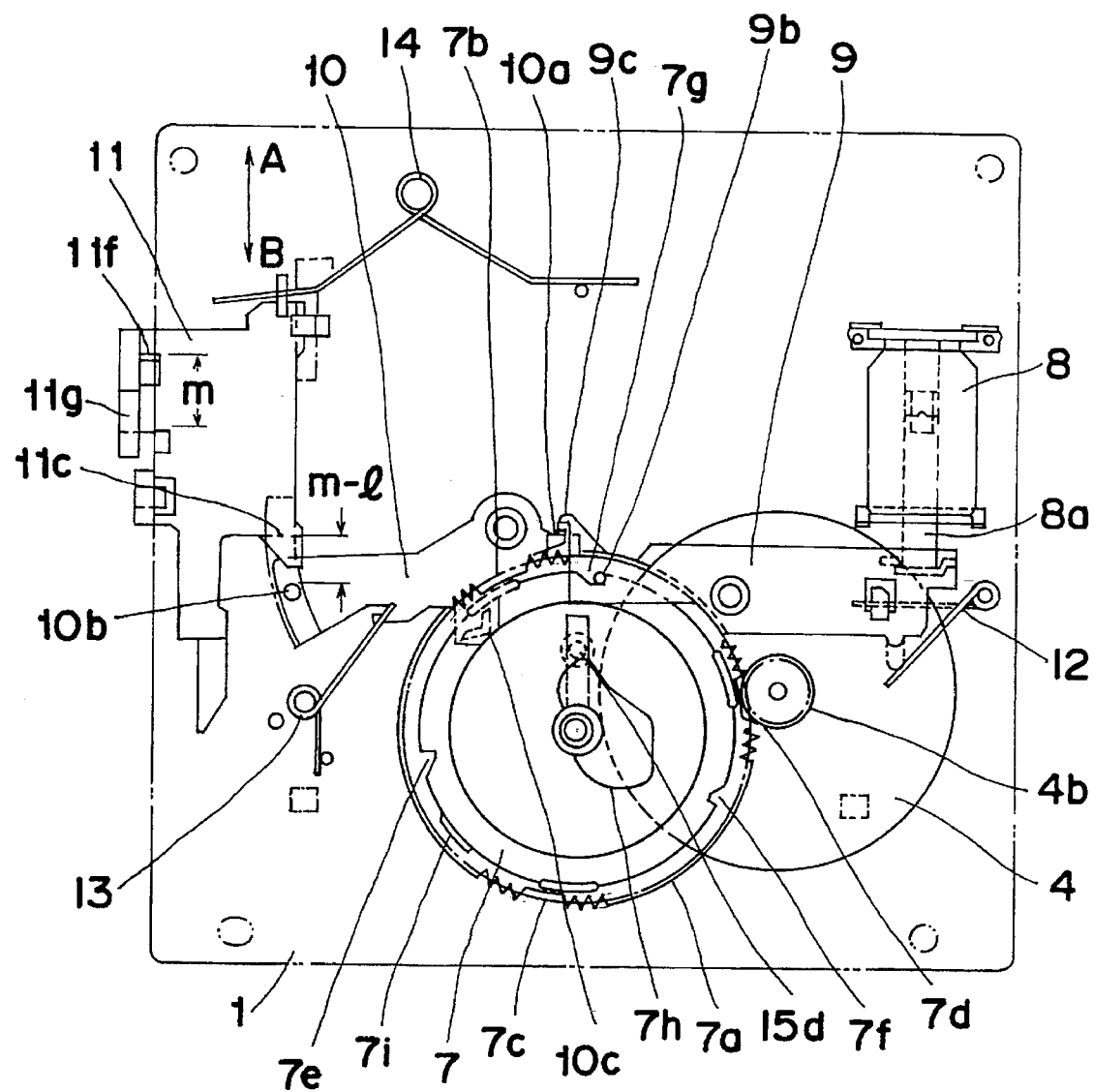
FIG. 15 is a schematic plan view of the cassette loading apparatus, showing the respective positions of the various component parts when the cassette mechanism is held at a fast feed position while the cassette holder is at the closed position.

When the cam gear 7 is rotated clockwise in the manner described above, the engagement pin 15d of the head carrier plate 15 then engaged with the cam portion 7gh of the cam gear 7 slides in the opposite directions shown respectively by the arrows A and B along the cam portion 7h as a result of rotation of the cam gear 7. At the same time, the reversible reel drive switching mechanism (not shown) of the tape recorder mechanism is actuated. As the cam gear 7 is further rotated clockwise, the engagement 7g of the cam gear 7 is brought into abutment with the stopper pin 9b of the trigger lever 9 and the toothless portion 7d of the cam gear 7 is aligned with the pinion gear 4b of the first flywheel 4. Thus, the engagement between the pinion gear 4b of the first flywheel and the toothed portion 7a of the cam gear 7 is released, thereby holding the cam gear 7 in position receiving no rotational force from the first flywheel 4. This condition is a fast feed position of the tape recorder mechanism and is shown in FIG. 15.

Figure 16:
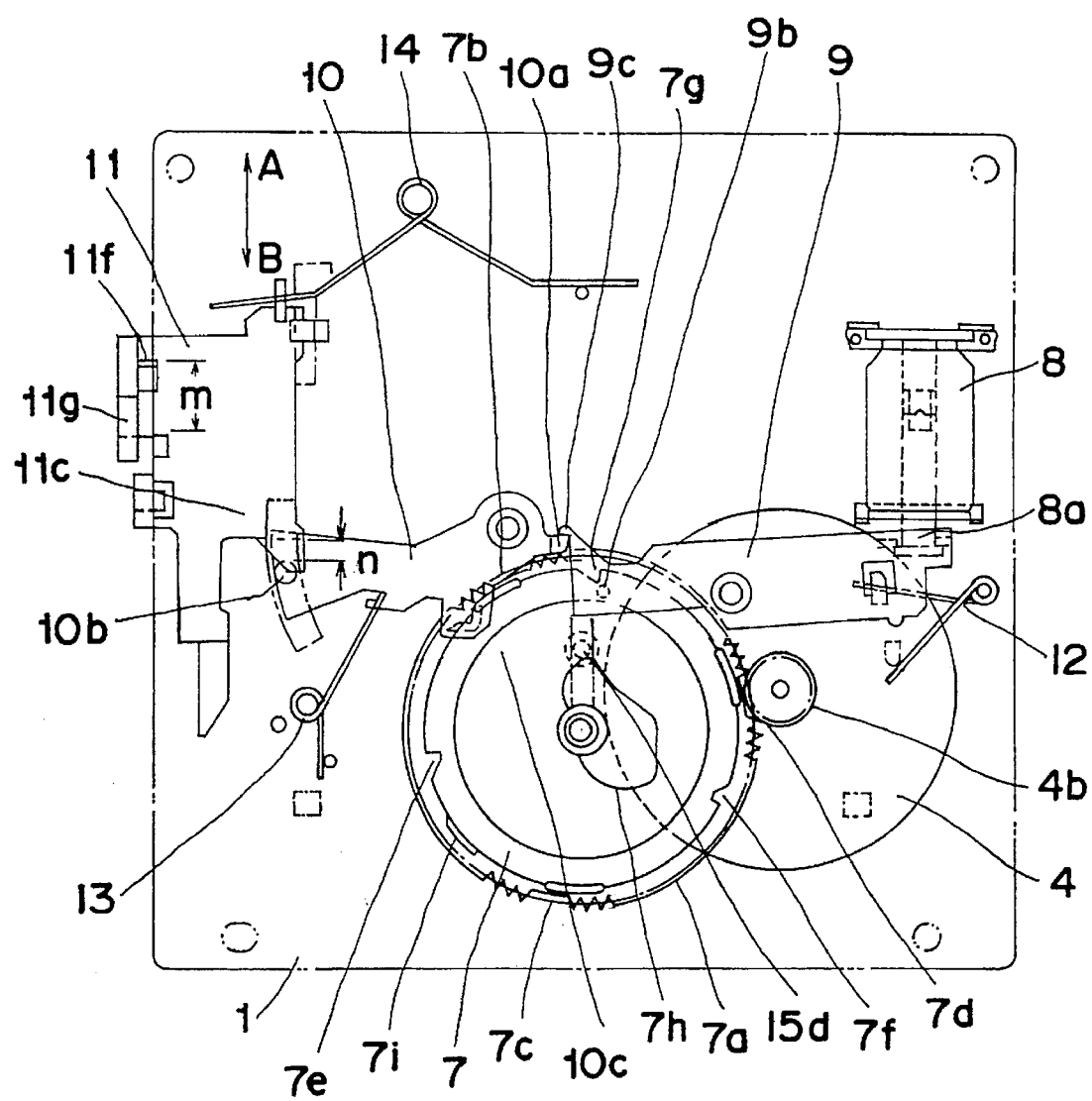
FIG. 16 is a view similar to FIG. 15, showing the solenoid plunger moved completely to the retracted position.

In order to release the tape recorder mechanism from the fast feed position, the solenoid unit 8 is to be supplied with an electric power to draw the plunger 8a to the retracted position as shown in FIG. 16 so that the trigger lever 9 can be pivoted counterclockwise to release the engagement between the engagement 7f of the cam gear 7 and the stopper pin 9b of the trigger lever 9. As is the case at the stop position and the reproducing position, even at the fast feed position the clearance of (m−1) when the solenoid unit 8 is deenergized and the clearance of n when the plunger 8a is moved to the retracted position are secured between the engagement pin 10b of the eject lever 10 and the engagement 11c of the eject rod 11. Also, since at the position to which the trigger lever 9 is pivoted at the time the plunger 8a of the solenoid unit 8 is completely moved to the retracted position as shown in FIG. 16 the stopper pin 9b of the trigger lever 9 is disengaged from the engagement 7g of the cam gear and, therefore, the cam gear 7 biased so as to rotate clockwise undergoes the rotation with the toothed portion 7a of the cam gear 7 consequently meshed with the pinion gear 4b of the first flywheel 4. Accordingly, the counterclockwise rotational force of the first flywheel 4 is transmitted to the cam gear 7 to cause the latter to rotate clockwise. In other words, with the cassette holder 18 held in the closed position, the cam gear 7 can be rotated by the attraction of the solenoid unit 8 as is the case when in the stop position and also in the reproducing position.

As hereinbefore described, the cassette loading apparatus of the present invention is so designed and so configured that, with the cassette holder 18 held in the open position, the tape recorder mechanism is disabled, but with the cassette holder 18 held in the closed position, the tape recorder mechanism can be enabled only when the tape cassette 19 is properly loaded at the play position of the tape recorder mechanism, to thereby increase the reliability and the stability of the cassette tape loading.

A cassette eject operation of the cassette loading apparatus of the present invention will now be described.

Figure 17:
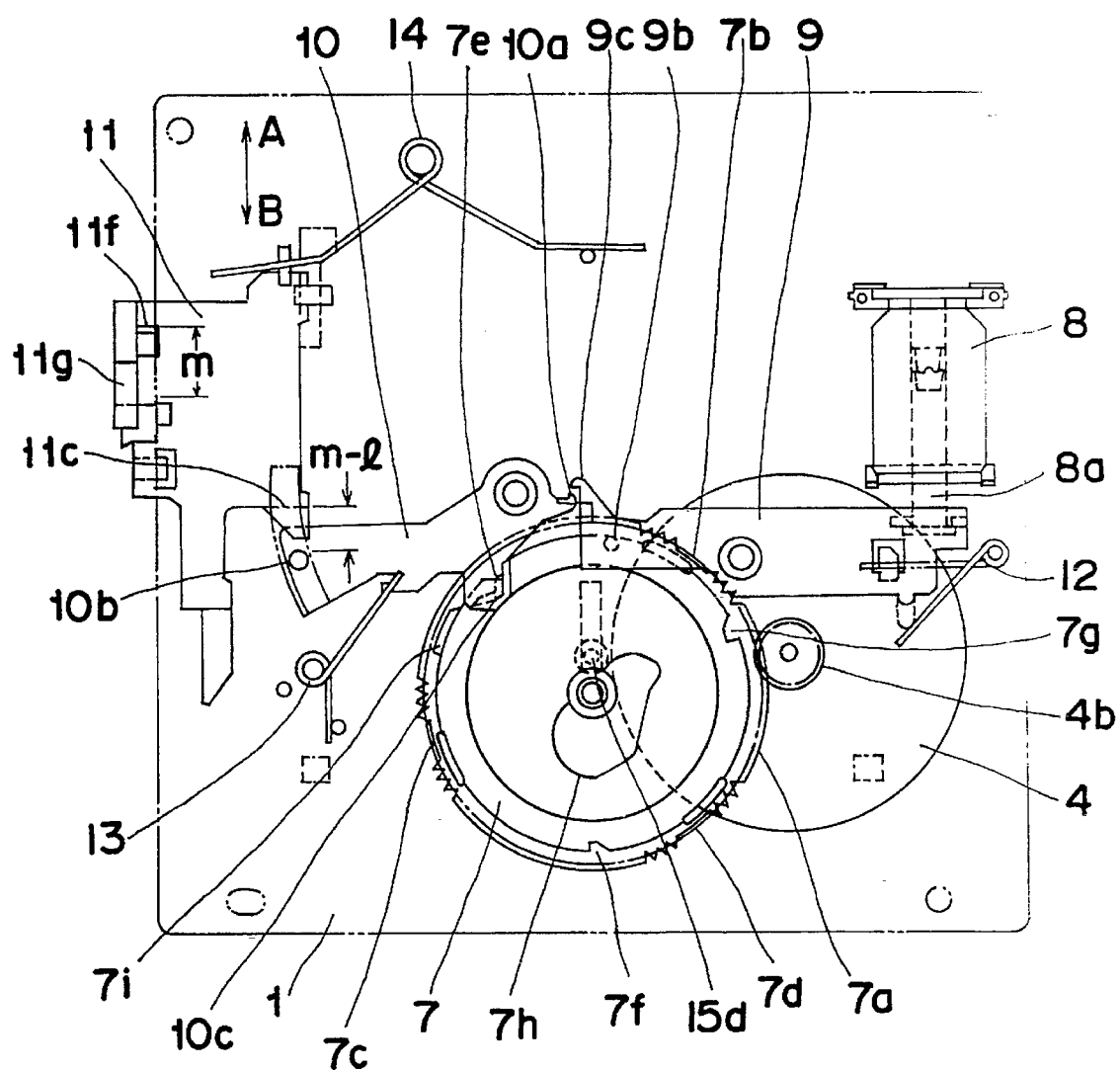
FIG. 17 is a schematic plan view of the cassette loading apparatus when the cassette mechanism is held at an eject operation select position while the cassette holder is at the closed position.

As shown in FIG. 16, by the attraction of the solenoid unit 8, the toothed portion 7a of the cam gear 7 is meshed with the pinion gear 4b of the first flywheel 4, causing the cam gear 7 to rotate clockwise. During the clockwise rotation of the cam gear 7, the head carrier plate 15 having the engagement pin 15d engaged with the cam portion 7h of the cam gear 7 undergoes a sliding motion in the direction shown by the arrow B along the cam portion 7h of the cam gear 7. When the cam gear 7 is rotated a predetermined angle, the engagement pin 15d of the head carrier plate 15 is disengaged from the cam portion 7h of the cam gear, allowing the head carrier plate 15 to slide to and be held at the tape recorder mechanism stop position as shown in FIG. 11. The relation in position between the head block 16 and the tape cassette 19 at this time is such as shown in FIG. 10 in which the magnetic head 16a does not overlap with and is hence separated from a front window 19a of the tape cassette 19 and lateral projections 19b of the tape cassette 19. During this condition, selection is to be made between continuance of a released condition of the solenoid unit 8 and an attracting operation of the solenoid unit 8 for a predetermined time. FIG. 17 illustrates the condition in which the solenoid unit 8 is released whereas FIG. 17 illustrates the condition in which the solenoid unit 8 is energized to attract the plunger 8a.

Figure 18:
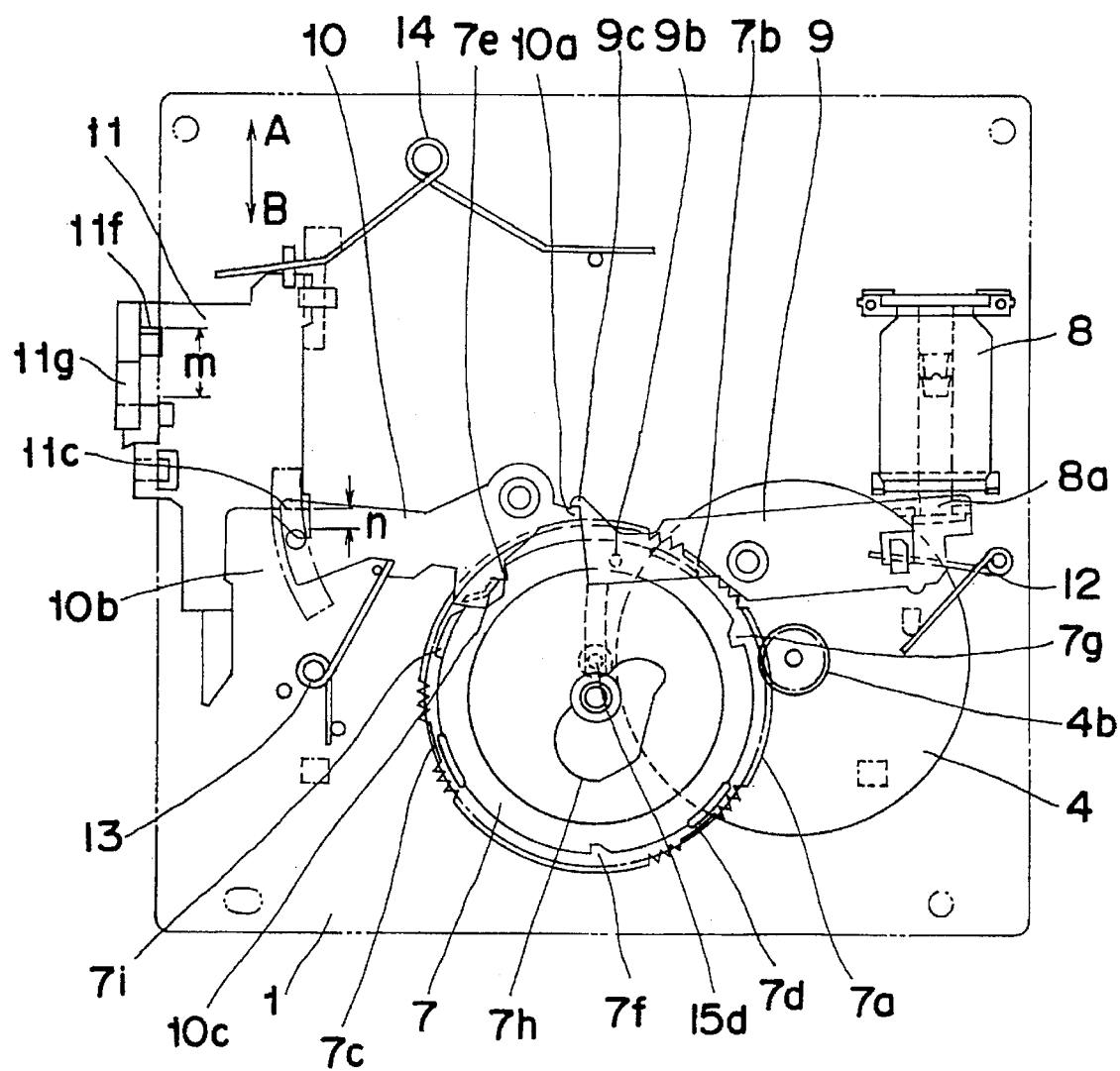
FIG. 18 is a view similar to FIG. 17, showing the solenoid plunger moved completely to the retracted position.

Since in the condition of FIG. 17 the eject lever 10 does not operate, the cam portion 7i of the cam gear 7 is held at a position unable to engage the engagement 10c of the eject lever 10, but in the condition of FIG. 18 the eject lever 10 is pivoted clockwise by the attraction of the solenoid unit 8 and, therefore, the cam portion 7i of the cam gear 7 is held in position engageable with the engagement 10c of the eject lever 10. It is to be noted that since any one of the conditions shown in FIGS. 17 and 18 represents the operation that takes place while the cassette holder 18 is in the closed position, the clearance of (m−1) when the solenoid unit 8 is deenergized and the clearance of n when the plunger 8a is moved to the retracted position are secured between the engagement pin 10b of the eject lever 10 and the engagement 11c of the eject rod 11.

Figure 19:
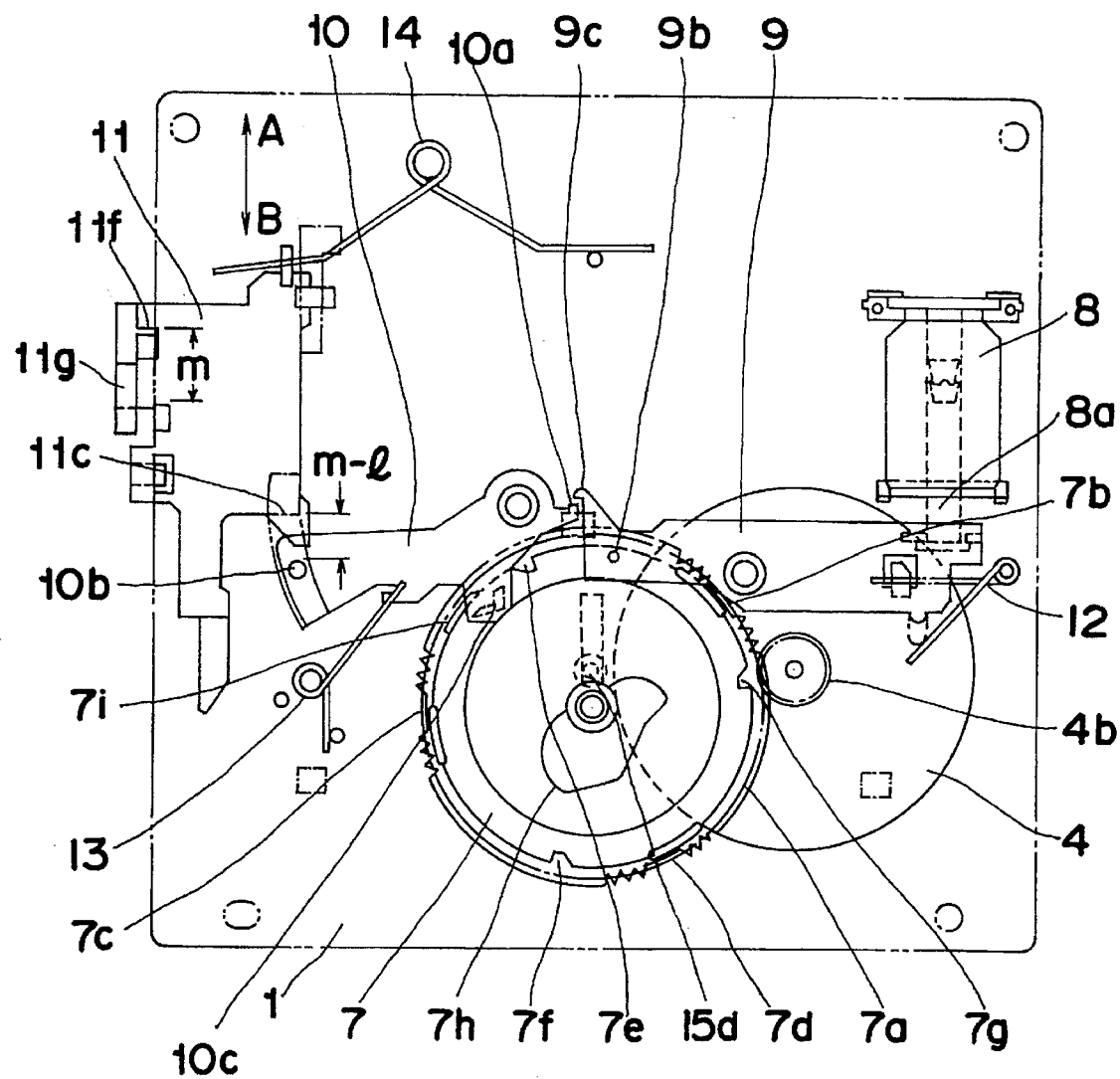
FIG. 19 is a schematic plan view of the cassette loading apparatus when the cassette mechanism is held at a cassette eject position while the cassette holder is at the closed position.

When starting from the condition shown in FIG. 17 the cam gear 7 is rotated clockwise, the cam portion 7i of the cam gear 7 move clear from the engagement 10c of the eject lever 10 without the engagement 10c being engaged with the cam portion 7i and, therefore, the various operating elements does not undergo any operation and the condition shown in FIG. 19 is established. Also, when starting from the condition shown in FIG. 18 the cam gear 7 is rotated clockwise, the engagement 10c of the eject lever 10 is engaged with the cam portion 7i of the cam gear 7 and, therefore, the eject lever 10 is pivoted clockwise against the biasing force of the spring 13 along the cam portion 71 as the cam gear 7 is so rotated. At this time, since the amount of pivot of the eject lever 10 guided along the cam portion 71 is greater than that when the plunger 8a of the solenoid unit 8 is completely moved to the retracted position and since the eject lever 10 continues its clockwise pivot even though the clearance between the engagement pin 10b of the eject lever 10 and the engagement 11c of the eject rod 11 is nulled and the engagement pin 10b is therefore brought into contact with the engagement 11c, the eject rod 11 is slide in the direction shown by the arrow A against a frictional force developed in the retainer 11f by the biasing force of the spring 14 and a biasing force of a biasing means (not shown) for the cassette holder 18; and, as the cam gear 7 is further rotated clockwise, the eject lever 10 arrives at a maximum pivoted position by the cam portion 7i, thereby establishing the conditions shown in FIGS. 20 and 21.

Figure 20:
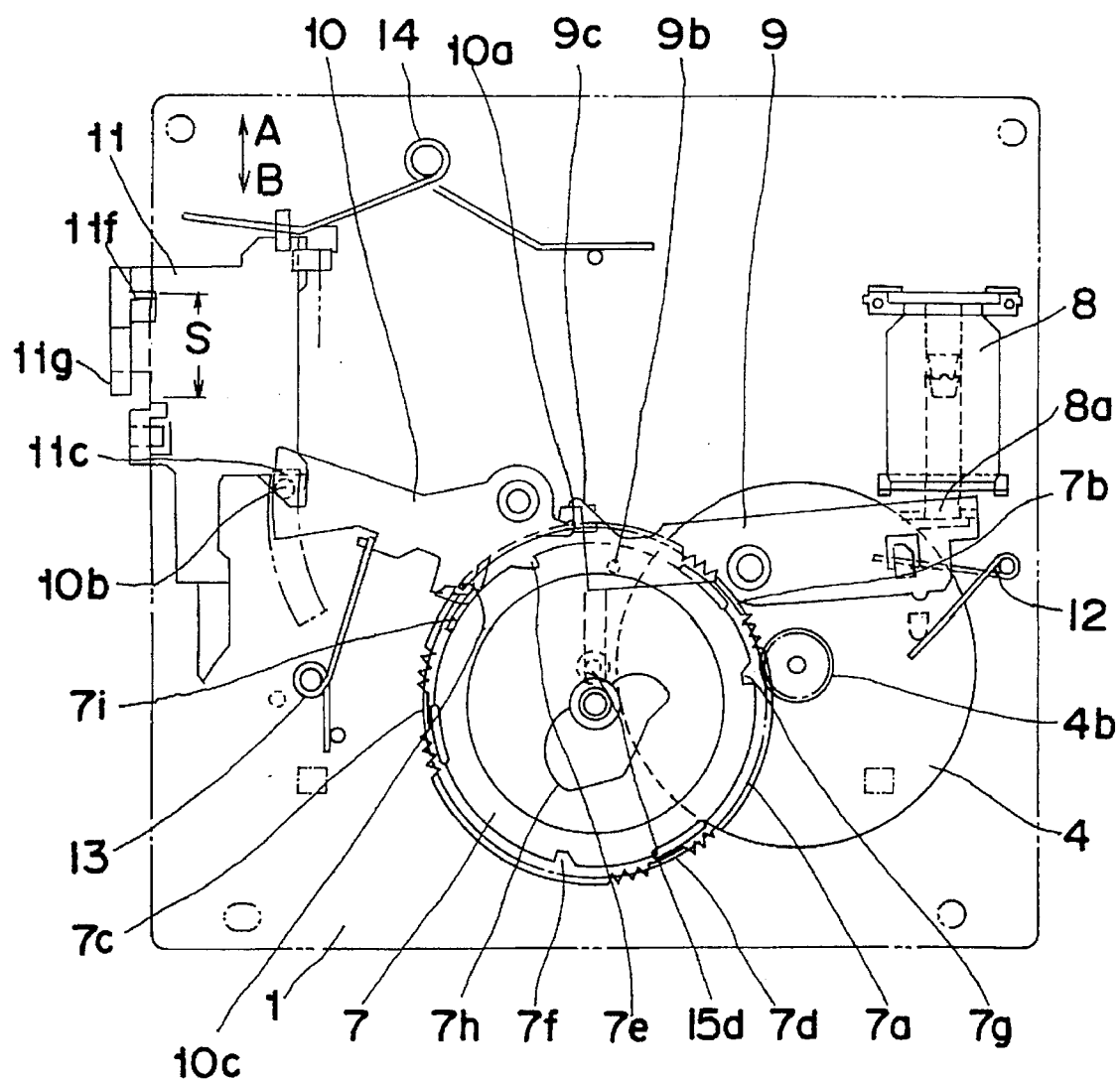
FIG. 20 is a view similar to FIG. 19, showing the cassette loading apparatus held in position to eject the tape cassette.
Figure 21:
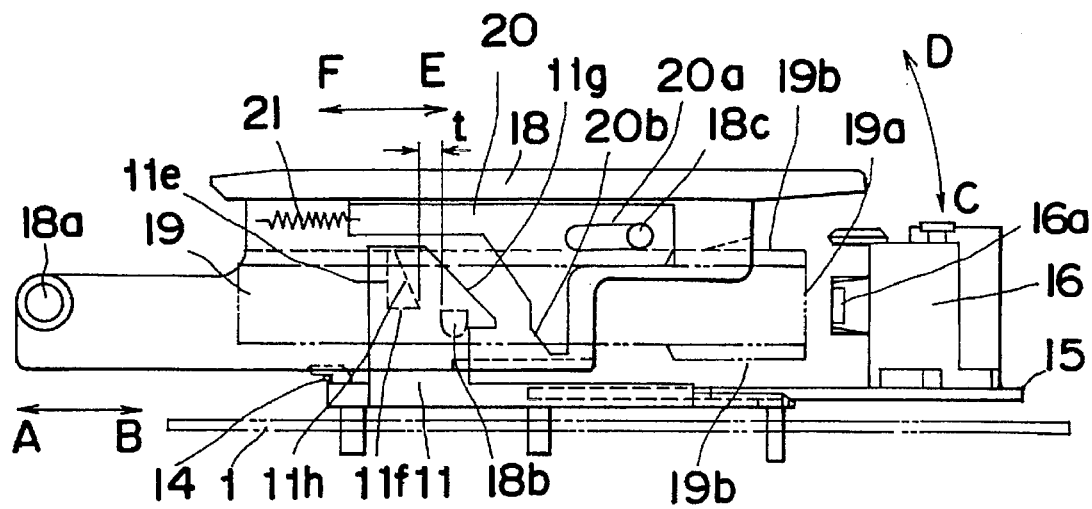
FIG. 21 is a schematic side view of the cassette loading apparatus shown when the various component parts thereof assume the respective positions as shown in FIG. 20.

Referring to FIG. 20, the eject lever 10 is shown as having been pivoted clockwise to the maximum pivoted position by the cam portion 7i of the cam gear 7 engaged with the engagement 10c of the eject lever 10 and, at the same time, the eject rod 11 having the engagement 11c engaged with the engagement pin 10b of the eject lever 10 is slid in the direction shown by the arrow A to a maximum slid position. The amount of pivot of the eject lever 10 guided by the cam portion 7i of the cam gear 7 and the amount of resultant sliding movement of the eject rod 11 are so chosen that the position s of the eject rod 11 at this maximum slid position from a reference line is greater than the position m at which the eject rod 11 is retained when the cassette holder 18 is in the closed position, that is, s>m, and that as shown in FIG. 21, retention of the projection 18b of the cassette holder 18 by the retainer 11f of the eject rod 11 can be released as shown in FIG. 21 to secure a clearance t between the retainer 11f and the projection 18b. Since in the condition shown in FIG. 21 the projection 18b of the cassette holder 18 is spaced the clearance t from the retainer 11f of the eject rod 11, the cassette holder 18 starts its pivotal movement in the direction shown by the arrow D by a biasing force of a suitable biasing means (not shown) after having experienced this condition.

Figure 22:
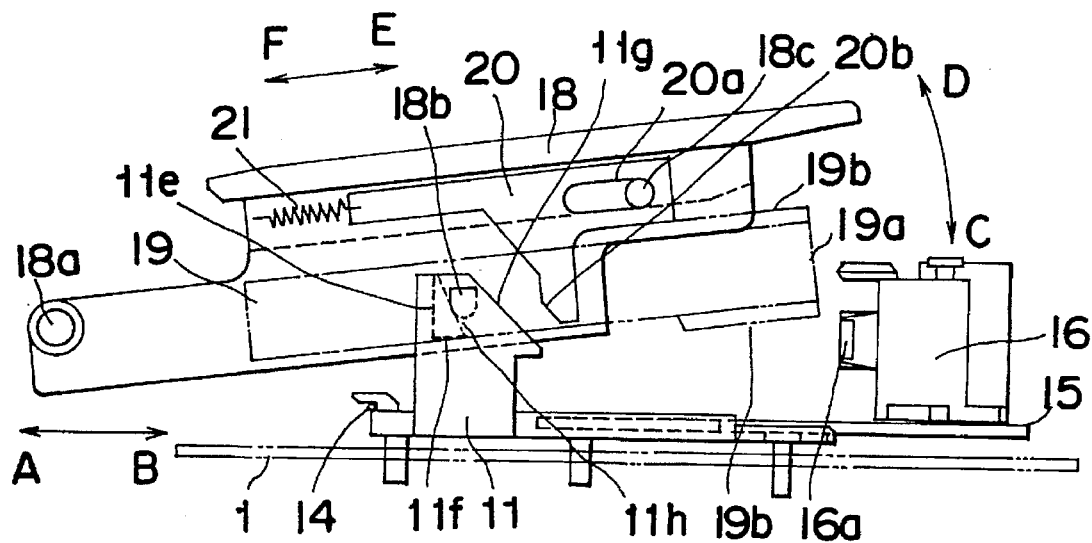
FIG. 22 is a schematic side view of the cassette loading apparatus, showing the cassette holder being moved from the closed position towards the open position.
Figure 23:
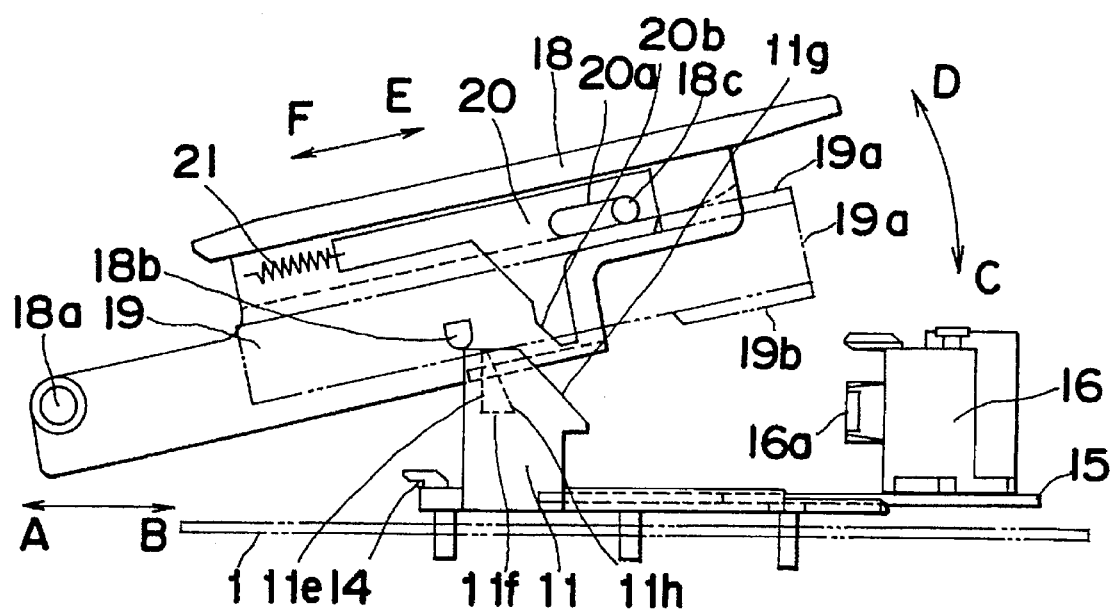
FIG. 23 is a schematic side view of the cassette loading apparatus, showing the cassette holder having been returned to the open position.

FIGS. 22 and 23 illustrates respective conditions that occur during the pivotal movement of the cassette holder 18 from the closed position (the tape play position) towards the open position (the cassette eject position). When starting from the condition shown in FIG. 20 the cam gear 7 is rotated clockwise, the engagement 11c of the eject lever 10 is disengaged from the cam portion 7i of the cam gear 7 and, at the same time, the attraction of the solenoid unit 8 is disabled. Accordingly, the eject lever 10 is pivoted counterclockwise by the action of the spring 13 and the eject rod 11 is correspondingly slid in the direction shown by the arrow by the action of the spring 14, but as shown in FIG. 22 the projection 18b of the cassette holder 18 is subsequently brought into contact with the inclined edge 11h of the eject rod 11. In this way, the position of the eject rod 11 is regulated by the position to which the cassette holder 18 is pivoted.

Further pivot of the cassette holder 18 in the direction shown by the arrow D results in disengagement of the projection 18b of the cassette holder 18 from the inclined edge 11h of the eject rod 11, allowing the eject rod 11 to slide in the direction shown by the arrow B by the biasing force of the spring 14 until the engagement 11c of the eject rod 11 is engaged with the engagement pin 10b of the eject lever 10. In this way, the movement of the eject rod 11 in the direction shown by the arrow B is thus regulated. Also, referring to FIGS. 22 and 23 since the head carrier plate 15 is held at the stop position of the tape recorder mechanism, the cassette holder 18 can be smoothly opened without allowing the magnetic head 16a carried by the head block 16 to collide against the front window 19a and the lateral projections 19b n of the tape cassette 19.

Thereafter, the cassette holder 18 is further pivoted in the direction shown by the arrow D by the biasing force and finally assumes the open position (the cassette eject position) as shown in FIG. 5. When at the same time the cam gear 7 is further rotated clockwise, the engagement 7e of the cam gear 7 is brought into abutment with the stopper pin 9b of the trigger lever 9 and the toothless portion 7b of the cam gear 7 is aligned with the pinion gear 4a of the first flywheel 4. Therefore, the pinion gear 4b of the first flywheel 4 is disengaged from the toothed portion 7a of the cam gear 7 with the cam gear 7 consequently held still without the rotational force of the first flywheel 14 transmitted thereto. However, since the cassette holder 18 has already moved to the open position and the eject rod 11 is retained at the position 1 from the reference line, the tape recorder mechanism is no longer operable as shown in FIG. 3.

Also, when the cam gear 7 is further rotated clockwise starting from the condition shown in FIG. 19, the engagement 7e of the cam gear 7 is engaged with the stopper pin 9b of the trigger lever 9 and the toothless portion 7b of the cam gear 7 is aligned with the pinion gear 4b of the first flywheel 4. Therefore, the pinion gear 4b of the first flywheel 4 is disengaged from the toothed portion 7a of the cam gear 7 with the cam gear 7 held still without the rotational force of the first flywheel 4 transmitted thereto. However, since at this time the cassette holder 18 is moved to the closed position and the eject rod 11 is engaged with and holds the cassette holder 18 at the position m from the reference line, the tape recorder mechanism is in position to be operated as shown in FIG. 11.

It is to be noted that as a means for causing the solenoid unit 8 to undergo an attracting operation when the cam gear 7 is rotated to a predetermined position during the rotation thereof as shown in FIG. 18, a means for detecting the length of time during which the cam gear 7 is rotated, a means for detecting the angular position of the cam gear 7 or a combination thereof may be employed.

Although the present invention has been described in connection with the preferred embodiments thereof with reference to the accompanying drawings, it is to be noted that various changes and modifications are apparent to those skilled in the art. For example, although in the foregoing description reference has been made to the cassette loading apparatus of a type wherein the reproducing position and the fast feed position both assumed by the cam gear are employed independently, the present invention can be equally applied to the type wherein the reproducing position and the fast feed position are located at one and the same position or wherein various operation are accomplished by the cam gear.

Such changes and modifications are to be understood as included within the scope of the present invention as defined by the appended claims, unless they depart therefrom.

What is claimed is:

1. A cassette loading apparatus for a cassette tape recorder of a type including a head carrier carrying a magnetic recording and/or reproducing head and movable between stop and reproducing positions in a direction confronting a front face of the magnetic recording and/or reproducing head, which apparatus comprises:

a drive motor for driving the cassette tape recorder;

a gear means drivingly coupled with said drive motor;

a rotary gear engageable with said gear means to rotate to thereby control the stop and reproducing positions of the head carrier through a rotary-to-linear motion translator, said rotary gear having defined therein a direction of rotation thereof a plurality of position regulating portions corresponding to the stop and reproducing positions and a toothless portion disengageable from the gear means, said rotary gear also having a cam portion defined therein at a location between the stop and reproducing positions and being biased so as to rotate;

an operating solenoid unit;

a first actuating lever having an engagement means detachably engageable with said position regulating portions to permit the gear means to be aligned with the toothless portion, said engagement means being biased in a stopping direction, said first actuating lever being operatively associated with the solenoid unit to rotate to thereby cause the engagement means to disengage from the position regulating means;

a second actuating lever operatively coupled with the solenoid unit through the first actuating lever, said second actuating lever having an engagement means engageable with the cam portion when pivoted in driving association with the solenoid unit through the first actuating lever, said engagement means of the second actuating lever being angularly moved in a direction conforming to the direction of rotation of the rotary gear after having been pressed to the cam portion by the rotation of the rotary gear;

a cassette holder for supporting a cassette and movable between a play position, in which the cassette confronts the magnetic recording and/or reproducing head, and an eject position in which the cassette is spaced from the play position; and a holding member detachably engageable with the cassette holder when the latter is in the play position and drivingly associated with a pivot motion of the second actuating lever caused by said cam portion to release the cassette holder.

2. A cassette loading apparatus for a cassette tape recorder of a type including a head carrier carrying a magnetic recording and/or reproducing head and movable between stop and reproducing positions in a direction confronting a front face of the magnetic recording and/or reproducing head, which apparatus comprises:

a drive motor for driving a cassette tape recorder mechanism;

a solenoid unit for controlling various operating conditions of the cassette tape recorder;

a cam gear having a toothless portion and operatively associated with various operating elements of a tape recorder mechanism;

a connecting means having first and second ends opposite to each other, said first end of said connecting means being coupled with the solenoid unit whereas said second end of said connecting means is engageable with the cam gear, said connecting means being operable to regulate a position of the cam gear so that a rotational force of the connecting means may be selectively transmitted to the cam gear;

a first slidable member supported on a chassis for sliding movement in two directions opposite to each other and engageable with the connecting means, said first slidable member having a first engagement formed therein;

a first biasing means for biasing the first slidable member with a biasing force of a magnitude greater than a force of attraction of the solenoid unit;

a cassette holder for supporting a tape cassette and movable between a play position and an eject position, said cassette holder having a second engagement formed therein;

a second slidable member supported by the cassette holder for movement two directions opposite to each other;

a second biasing means for biasing the second slidable member with a biasing force of a magnitude greater than that of the first biasing means;

said first slidable member being engaged with the connecting means to halt an attracting operation of the solenoid unit during supply of an electric power to the solenoid unit when the cassette holder is held at the eject position;

during the pivotal movement of the cassette holder from the eject position towards the play position, said second slidable member and the second engagement of the cassette holder are engaged with the first slidable member and the first engagement of the first slidable member, respectively, so that when a reactive force of the first and second biasing means acts on a point of engagement between the first and second slidable members as a result of the pivotal movement of the cassette holder from the eject position towards the play position, said first engagement of the first slidable member is engaged with the second engagement of the cassette holder to inhibit a sliding motion of the first slidable member, said reactive force on said point of engagement acting on the second slidable member to allow the second slidable member to undergo a sliding motion, that is, an attracting action of the solenoid unit during the supply of an electric power thereto is inhibited by regulating the position of the slidable member; and the engagement between the respective first and second engagements of the first slidable member and the cassette holder being released when the cassette holder is pivoted to the play position, to allow the first slidable member to slide together with the second slidable member by a biasing force of the second biasing means through the second slidable member to thereby disengage the first slidable member from the connecting means to allow the solenoid unit to undergo the attracting operation during the supply of the electric power thereto.

3. The cassette loading apparatus as claimed in claim 1, wherein when the cassette holder is pivoted to the play position with the first engagement of the first slidable member disengaged from the second engagement of the cassette holder and the first slidable member is slidingly moved to a position where the attracting operation of the solenoid unit during the supply of the electric power thereto is enabled, the second engagement of the cassette holder is held by the first engagement of the first slidable member to thereby continuously hold the cassette holder at the play position.

4. The cassette loading apparatus as claimed in claim 3, wherein said connecting means includes a first actuating lever coupled at one end with the solenoid unit and at the other end adapted to regulate the position of the cam gear for selectively transmitting the rotational force of the drive motor to the cam gear, and a second actuating lever formed with a third engagement engageable with the first slidable member and also engageable with the am portion of the cam gear at a predetermined position generally intermediate between a reproducing or fast feed position of the tape recorder mechanism and a stop position of the tape recorder mechanism;

said third engagement of the second actuating lever being displaced to a position ready to engage with the cam portion of the cam gear through the first actuating lever when the solenoid unit is in a condition to attract during positioning of the cam gear at said predetermined position while the cassette holder is held at the play position, said second actuating lever being pivoted in response to rotation of the cam gear to cause the second actuating lever to engage with the first slidable member, said first slide member being slide as a result of an amount of displacement of the second actuating lever to thereby release the cassette holder, then held at the play position by the first engagement of the first slidable member, from the play position, but said third engagement of the second actuating lever being brought to a position non-engageable with the cam portion of the cam gear when the solenoid unit is released.

* * * * *